United States Patent
Cummins

(10) Patent No.: US 7,029,577 B2
(45) Date of Patent: Apr. 18, 2006

(54) AQUACULTURE SYSTEM

(75) Inventor: Ian Geoffrey Cummins, Ernest Queensland (AU)

(73) Assignee: Cumminscorp.Limited, Brisbane (AU)

( * ) Notice: Subject to any disclaimer, the term of this patent is extended or adjusted under 35 U.S.C. 154(b) by 48 days.

(21) Appl. No.: 10/478,210

(22) PCT Filed: Sep. 12, 2002

(86) PCT No.: PCT/AU02/01245

§ 371 (c)(1), (2), (4) Date: Nov. 28, 2003

(87) PCT Pub. No.: WO03/022041

PCT Pub. Date: Mar. 20, 2003

(65) Prior Publication Data

US 2004/0149233 A1    Aug. 5, 2004

(30) Foreign Application Priority Data

Sep. 12, 2001 (AU) .................................... PR7600
Dec. 17, 2001 (AU) .................................... PR9474
Apr. 4, 2002 (AU) .................................... PS1509

(51) Int. Cl.
*A01K 63/04* (2006.01)
*A01K 61/00* (2006.01)
*C02F 3/06* (2006.01)
*C02F 1/32* (2006.01)
*C02F 1/78* (2006.01)

(52) U.S. Cl. .................. 210/169; 210/206; 210/416.2; 210/748; 210/905; 119/226; 119/227; 119/259; 119/260

(58) Field of Classification Search ................ 119/227, 119/226, 211, 224–228, 202, 203, 215, 259; 210/169, 198.1, 206, 416.1, 416.2, 760, 748, 210/905

See application file for complete search history.

(56) References Cited

U.S. PATENT DOCUMENTS

| | | | | |
|---|---|---|---|---|
| 2,016,123 A | * | 10/1935 | Schorr | 119/267 |
| 3,651,785 A | * | 3/1972 | Quinn | 119/248 |
| 4,052,960 A | | 10/1977 | Birkbeck | |
| 4,612,876 A | * | 9/1986 | Tigert | 119/253 |
| 4,842,726 A | * | 6/1989 | Willinger | 210/169 |
| 5,558,042 A | | 9/1996 | Bradley | |
| 5,593,574 A | * | 1/1997 | VanToever | 210/150 |
| 5,820,759 A | * | 10/1998 | Stewart et al. | 210/602 |

(Continued)

FOREIGN PATENT DOCUMENTS

EP         0209932        1/1987

(Continued)

*Primary Examiner*—Fred G. Prince
(74) *Attorney, Agent, or Firm*—Hoffman, Wasson & Gitler, P.C.

(57) ABSTRACT

A self-contained aquaculture system comprising a modular building defining a first main chamber for containing fish or marine invertebrates, a second swirl chamber comprising a primary filter communicating with the main chamber for removing solids from the main chamber, a drum filter for receiving and filtering water from the swirl chamber, a third biological filter chamber beneath the drum filter for receiving water therefrom and a biological filter tank. Water is pumped from the chamber. The building defines an enclosed space over the chambers, the temperature of which is controlled by an air conditioning unit. A foam fractionator, ultraviolet unit and ozone generator are used for treating the water in the main chamber.

48 Claims, 23 Drawing Sheets

U.S. PATENT DOCUMENTS

| | | | |
|---|---|---|---|
| 5,957,085 A * | 9/1999 | Youngstrom et al. | 119/246 |
| 5,961,831 A * | 10/1999 | Lee et al. | 210/614 |
| 6,117,313 A | 9/2000 | Goldman | |
| 6,234,113 B1 * | 5/2001 | Dor | 119/259 |
| 6,393,899 B1 * | 5/2002 | Shedd et al. | 73/61.41 |
| 6,432,312 B1 * | 8/2002 | Fuss | 210/668 |
| 6,443,097 B1 * | 9/2002 | Zohar et al. | 119/217 |
| 6,447,681 B1 * | 9/2002 | Carlberg et al. | 210/602 |
| 6,499,431 B1 * | 12/2002 | Lin et al. | 119/226 |
| 6,584,935 B1 * | 7/2003 | Zohar et al. | 119/204 |
| 6,722,314 B1 * | 4/2004 | Crisinel et al. | 119/226 |

FOREIGN PATENT DOCUMENTS

| | | | |
|---|---|---|---|
| EP | 0934697 | | 8/1999 |
| FR | 2255845 | * | 8/1975 |
| WO | WO 97/49279 | | 12/1997 |

\* cited by examiner

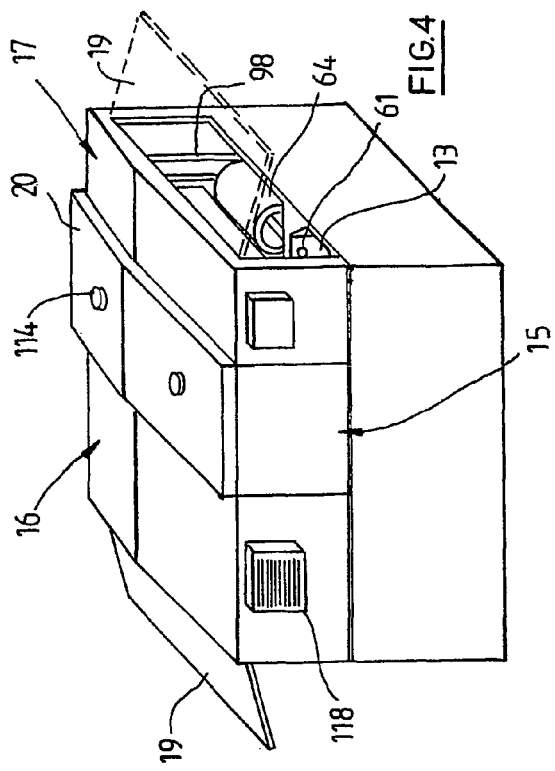
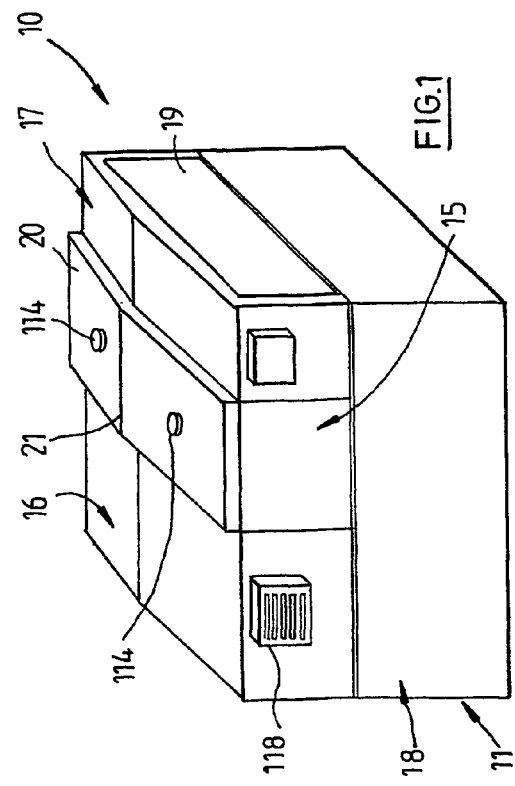
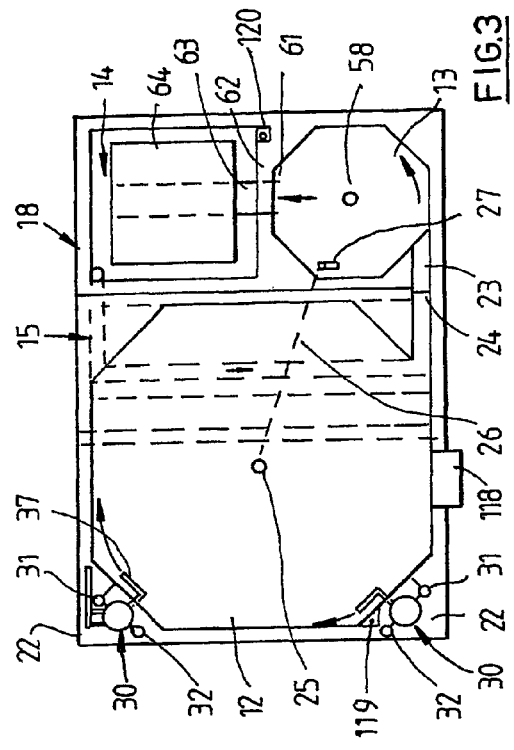
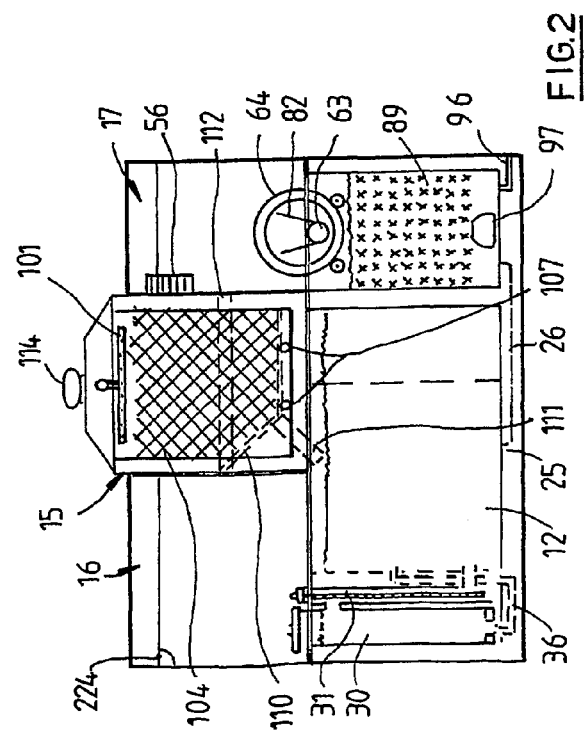

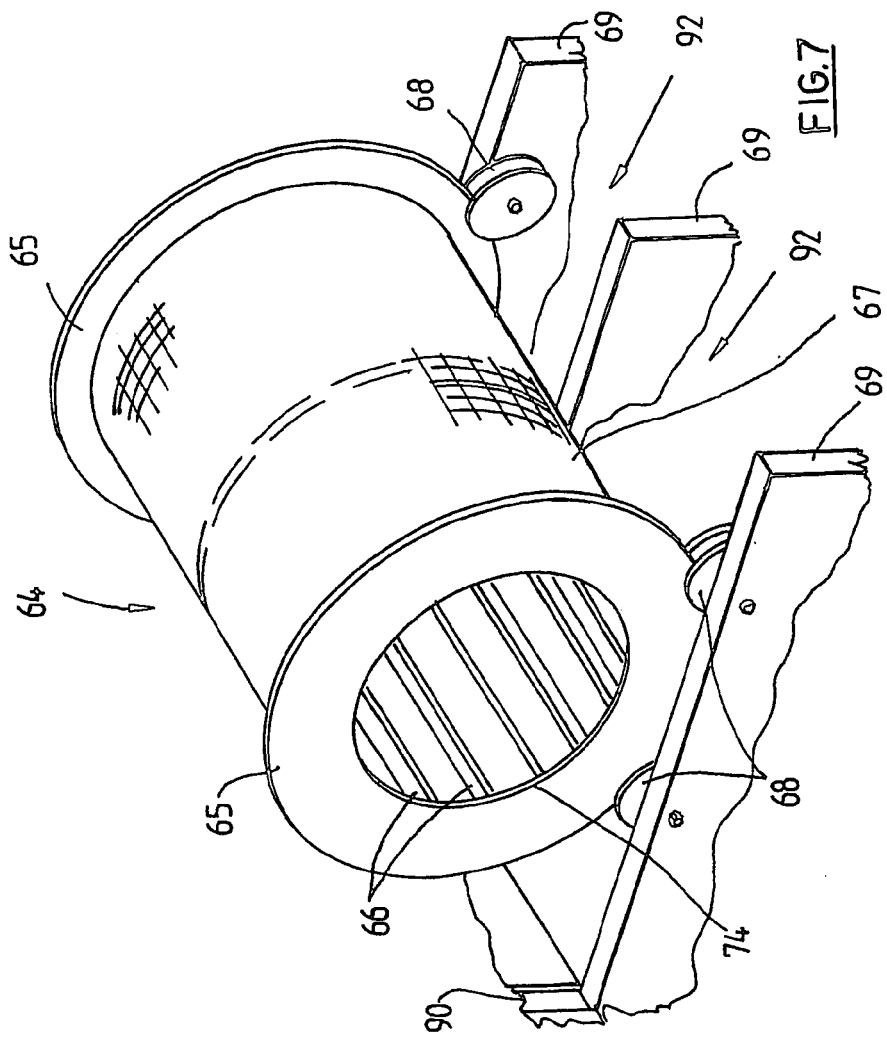
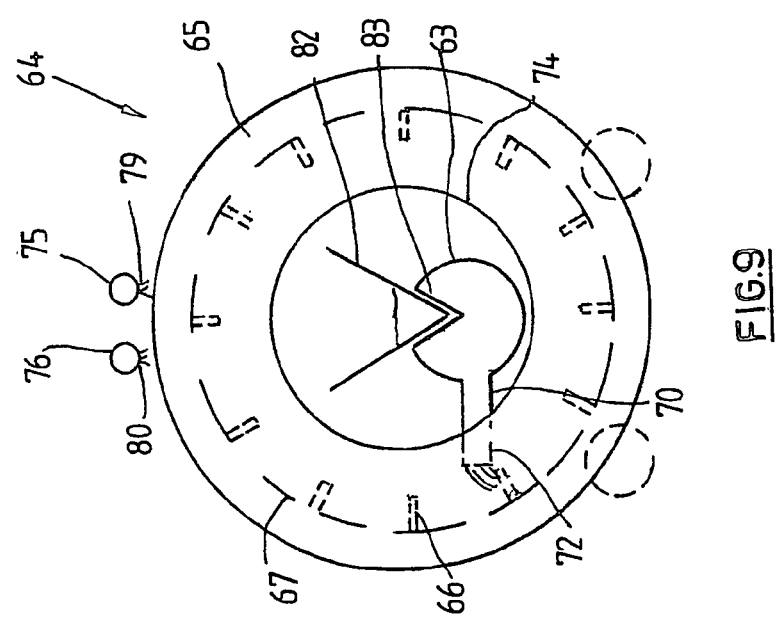

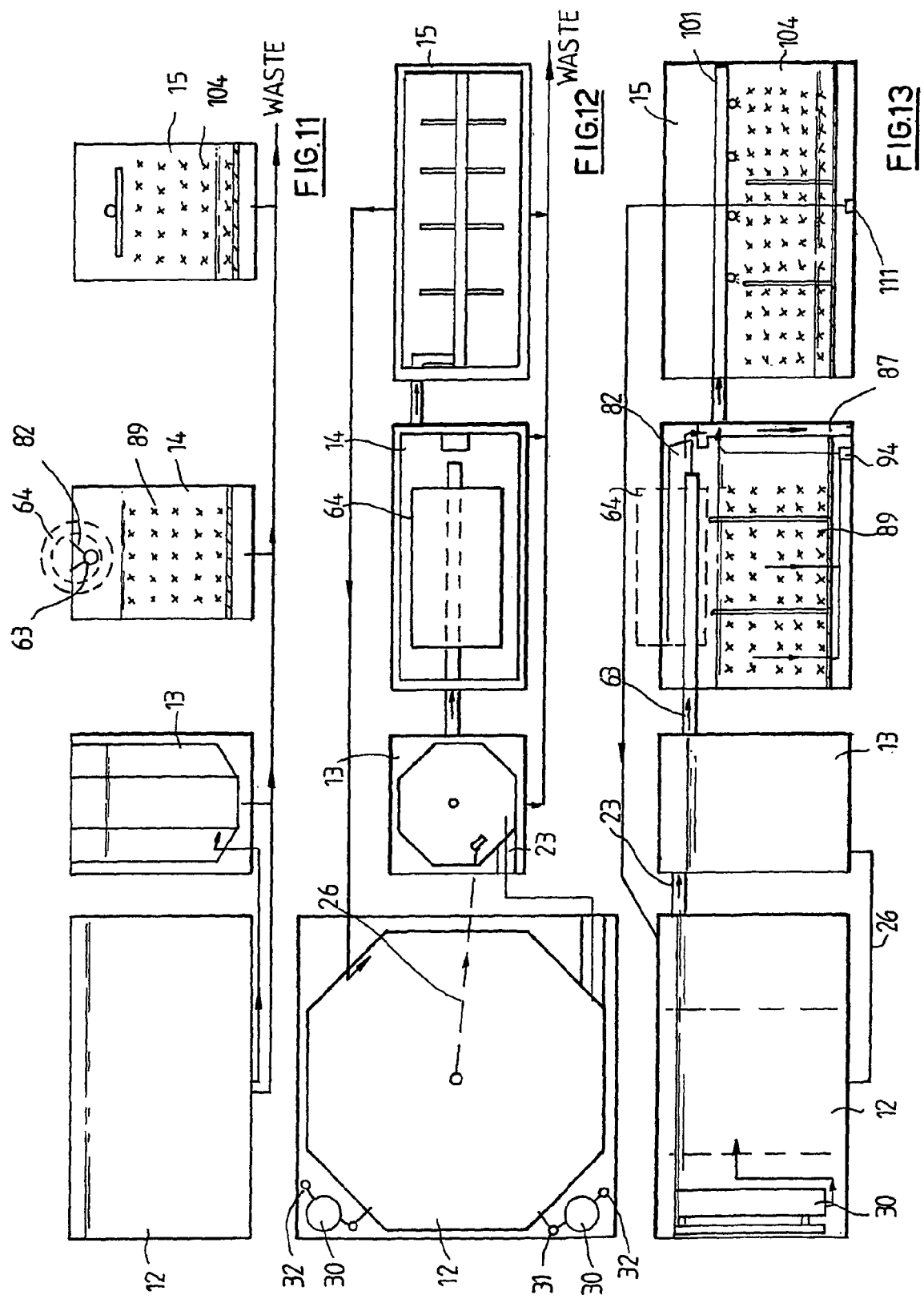

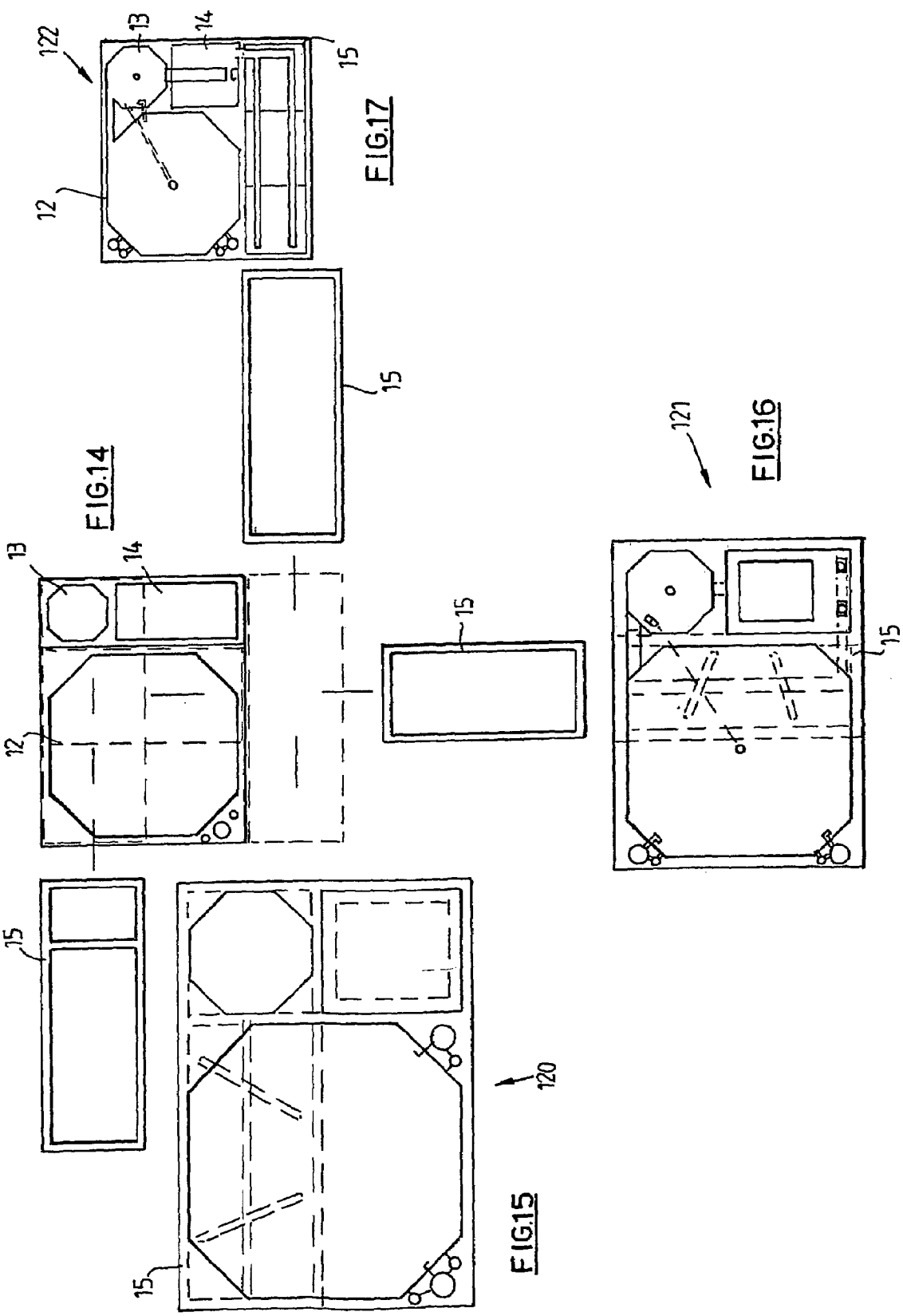

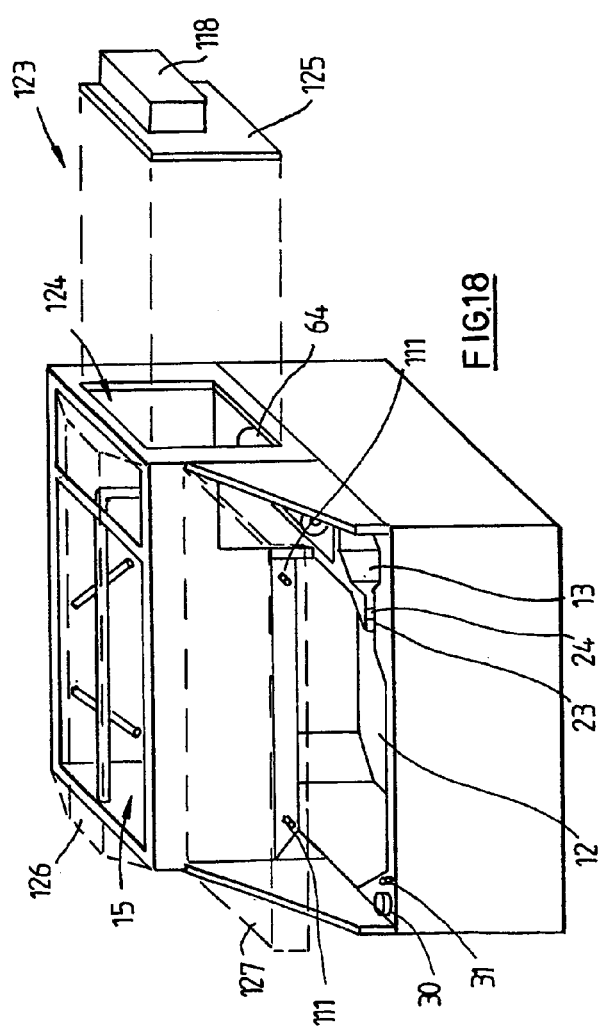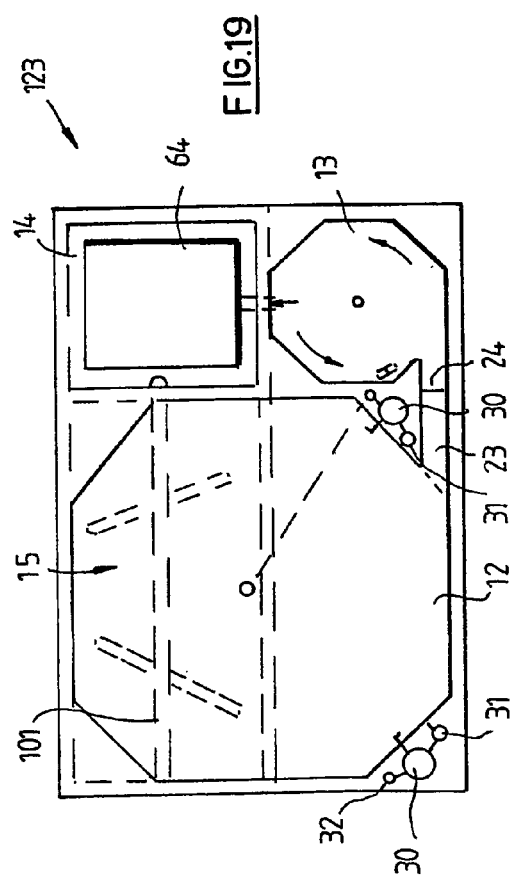
FIG.18
FIG.19

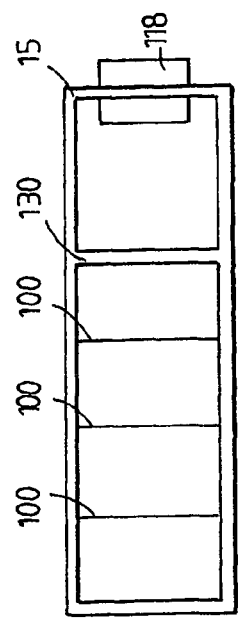
FIG.21
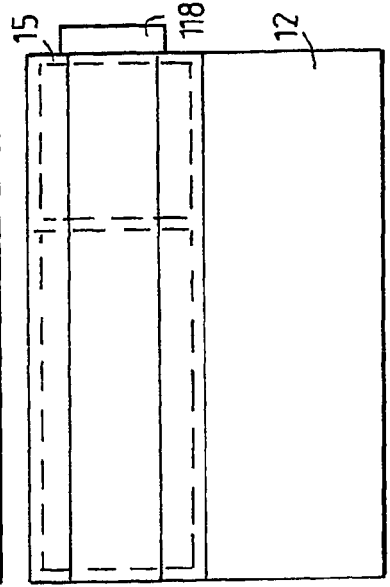
FIG.22
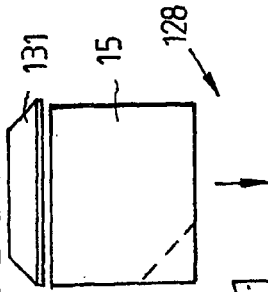
FIG.25
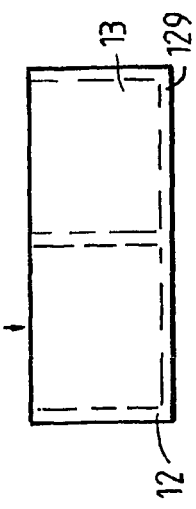
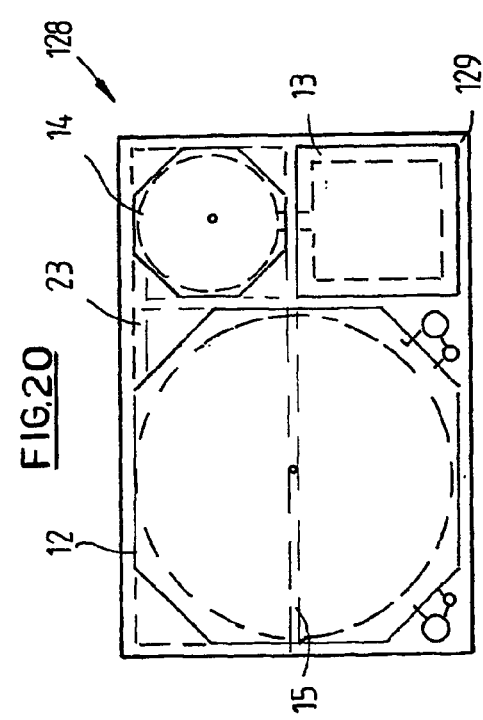
FIG.20
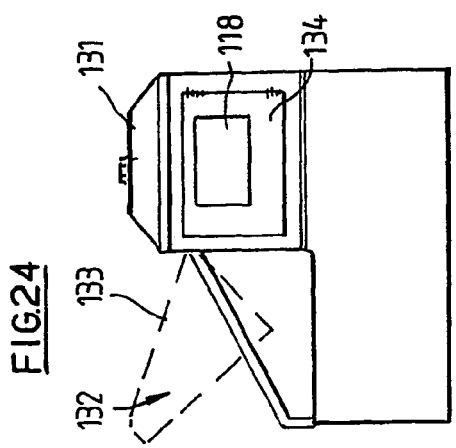
FIG.24
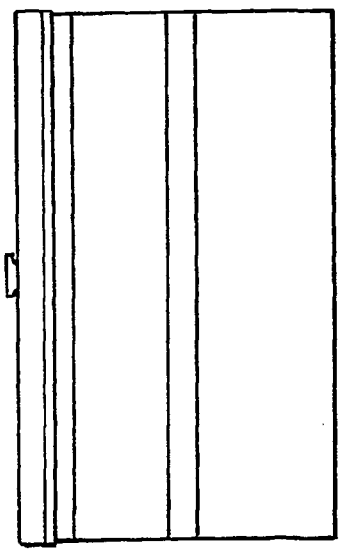
FIG.23

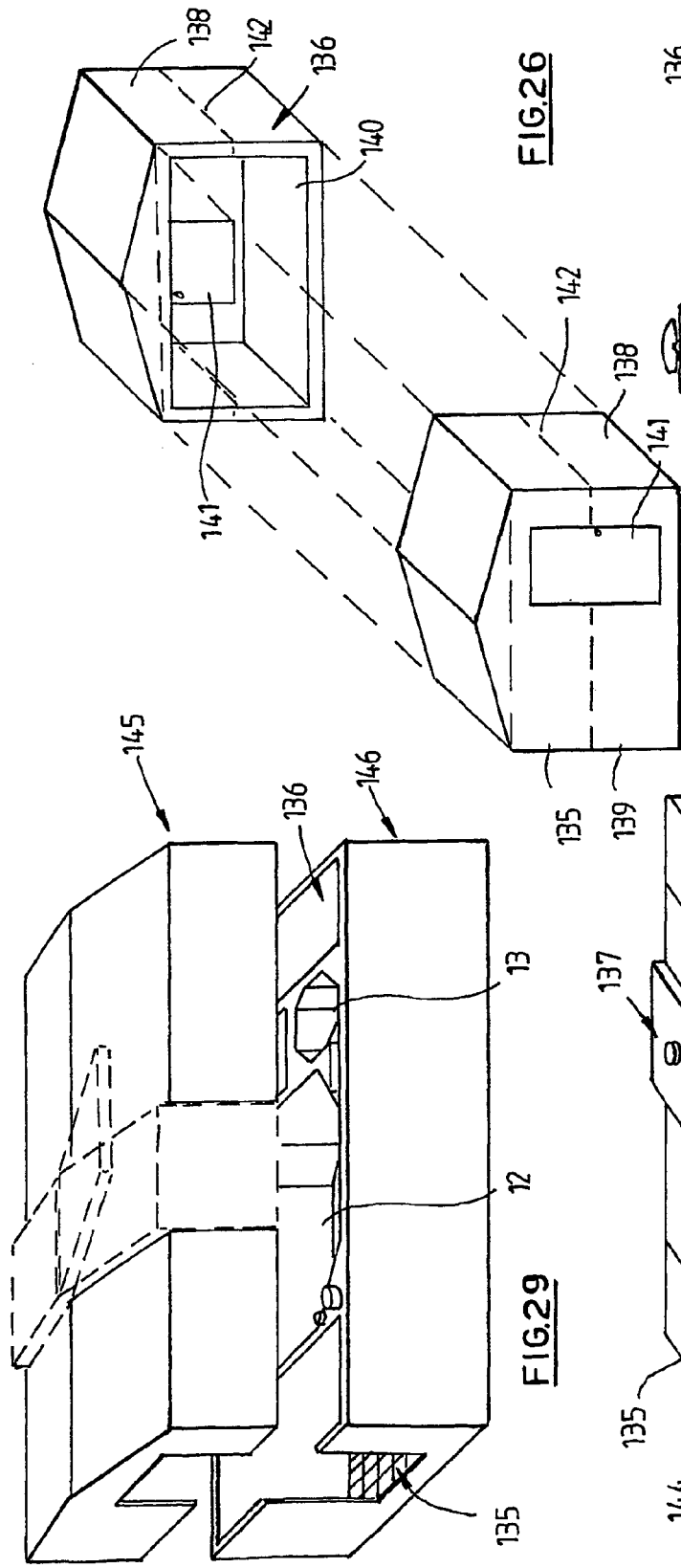

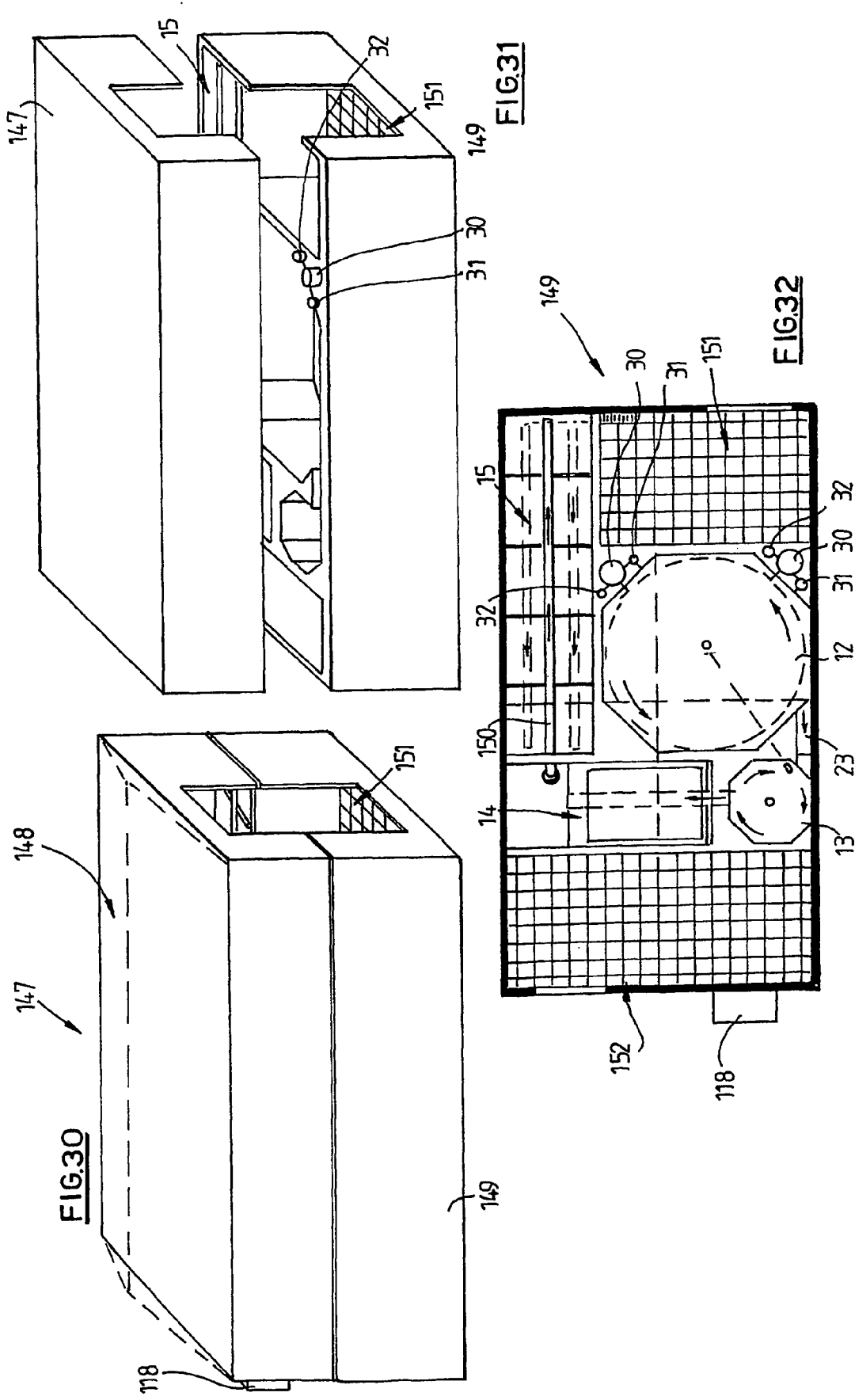

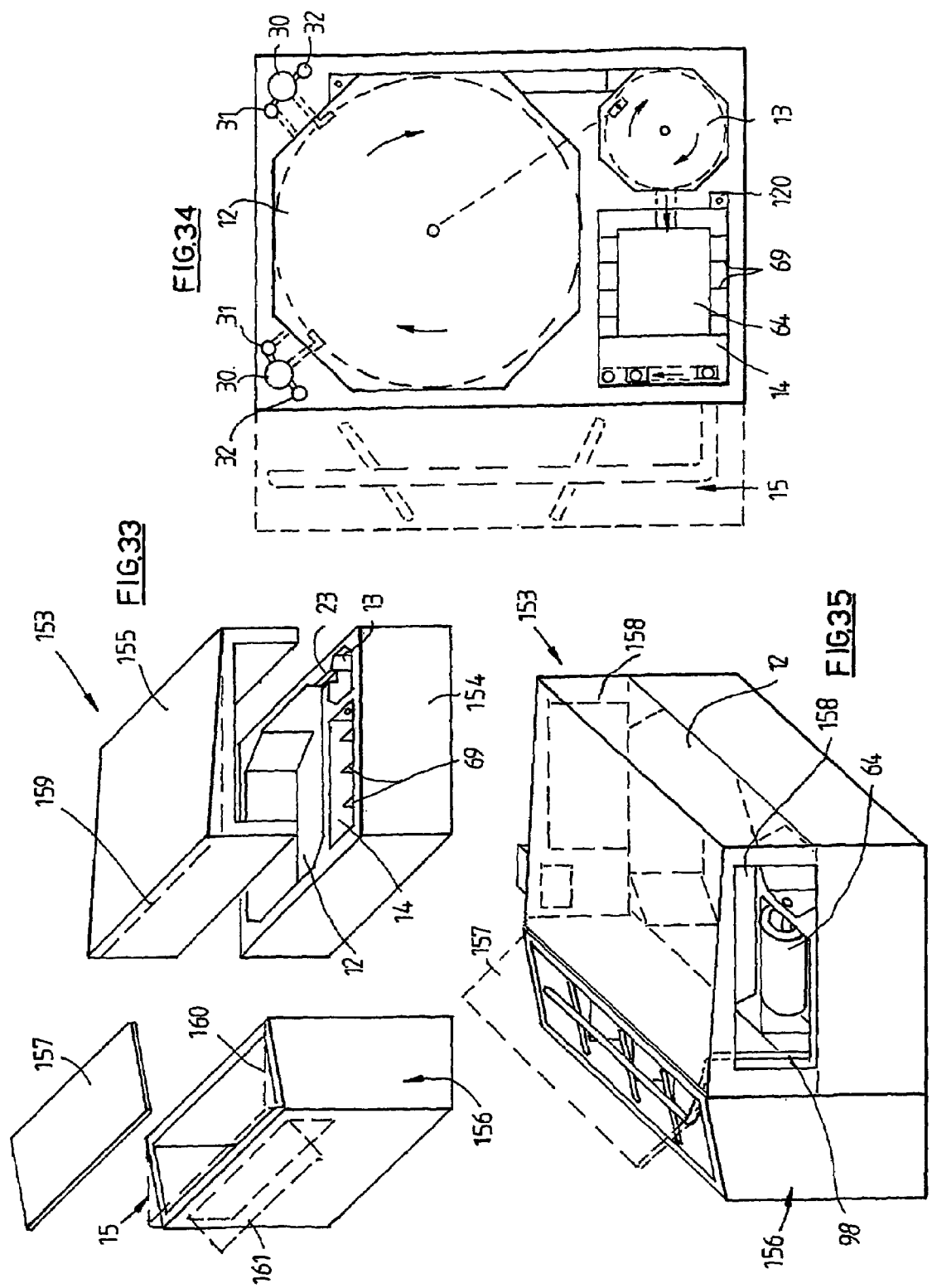

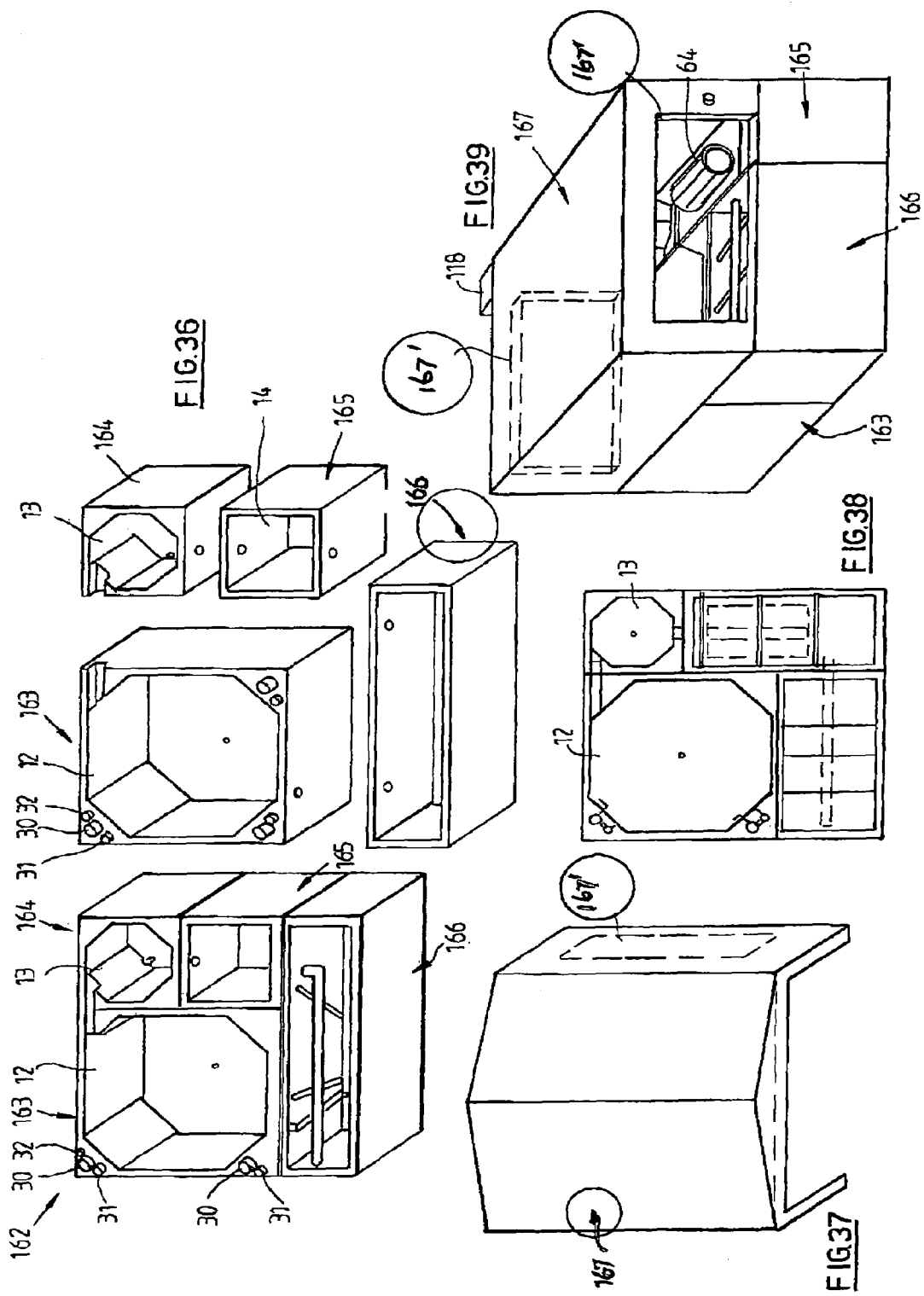

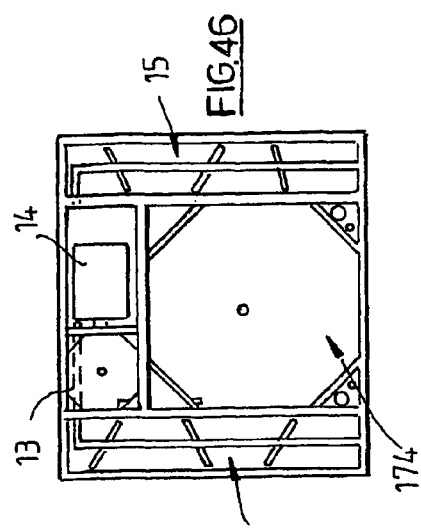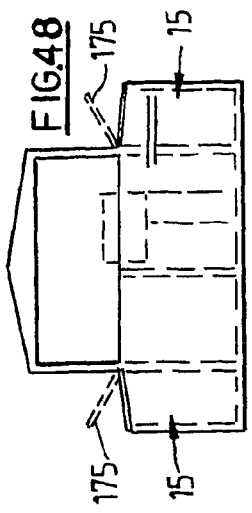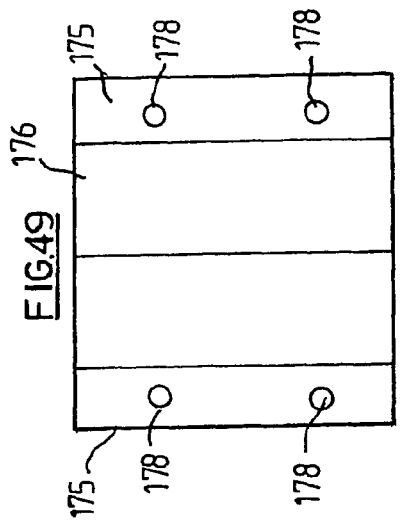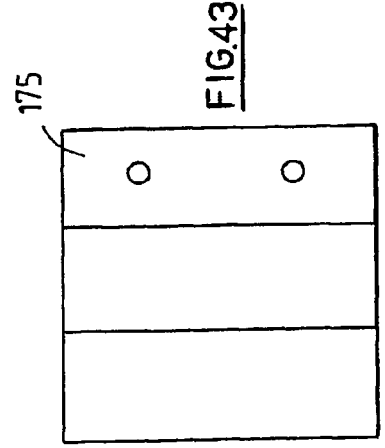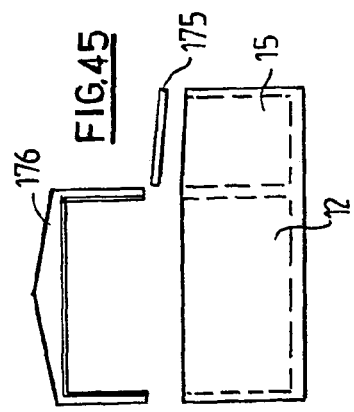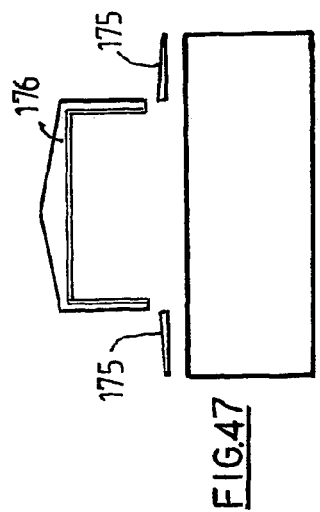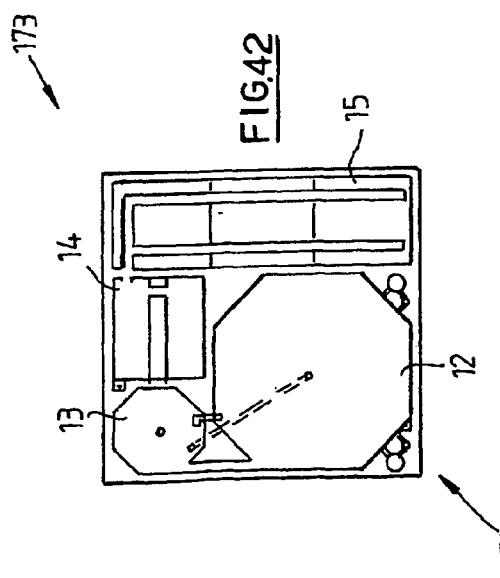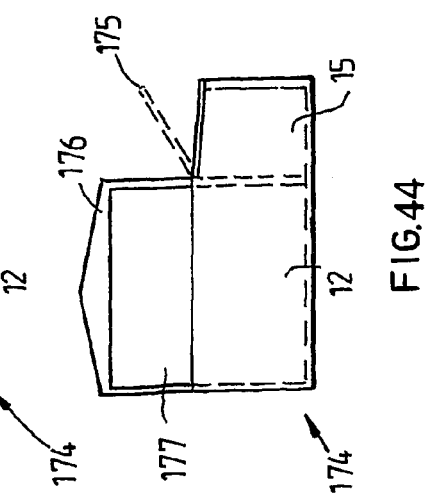

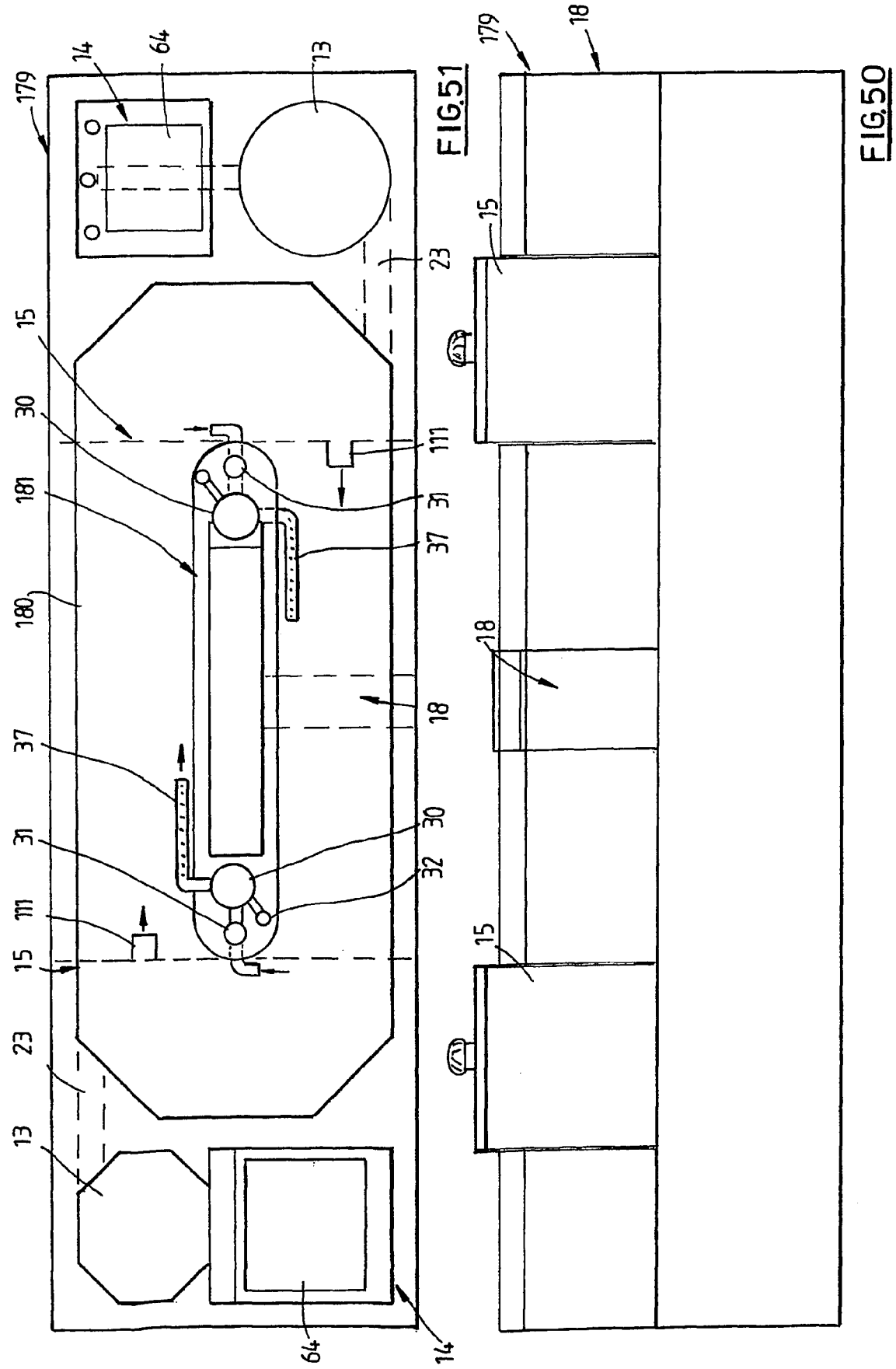

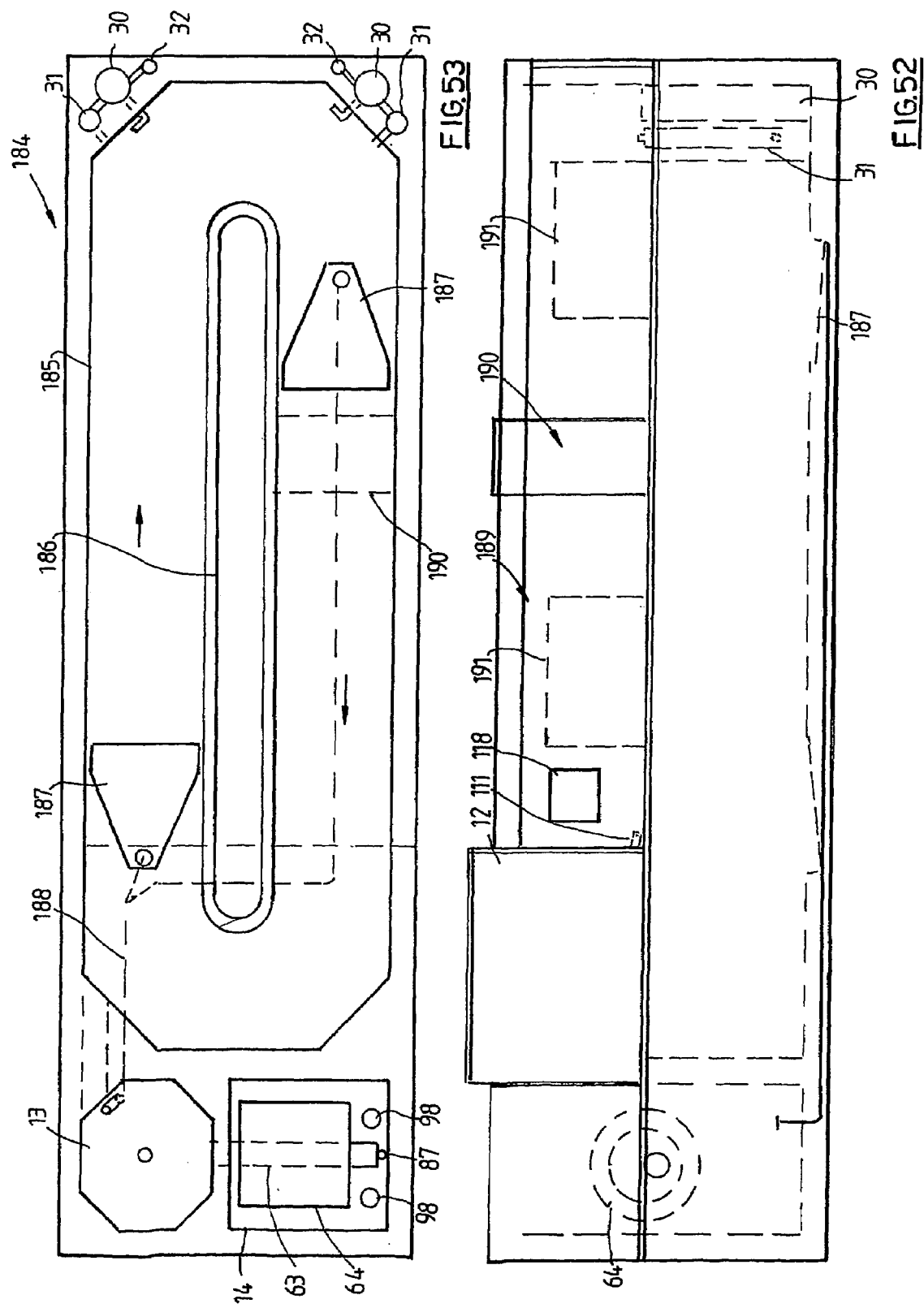

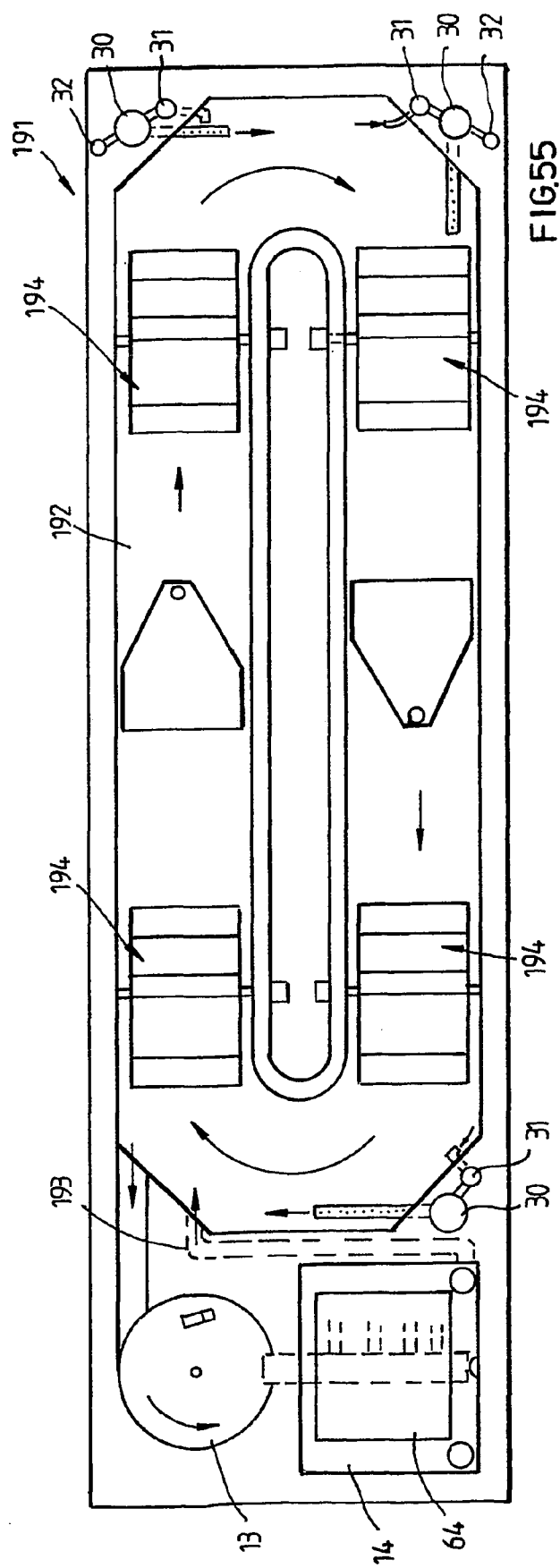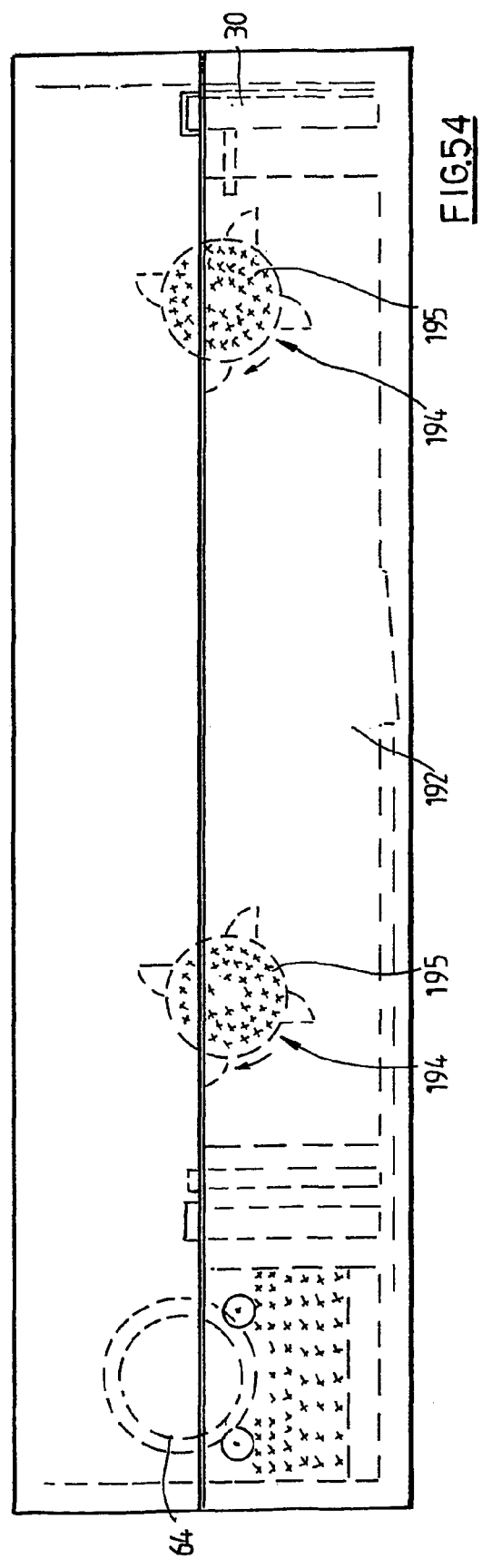

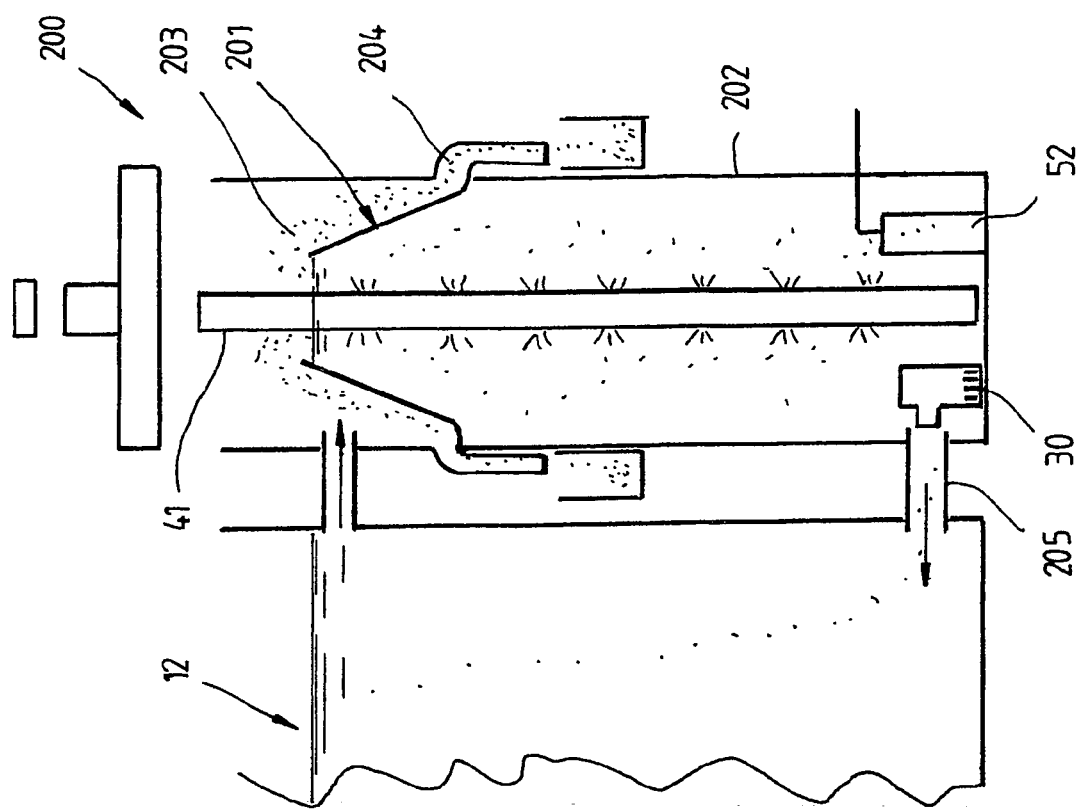
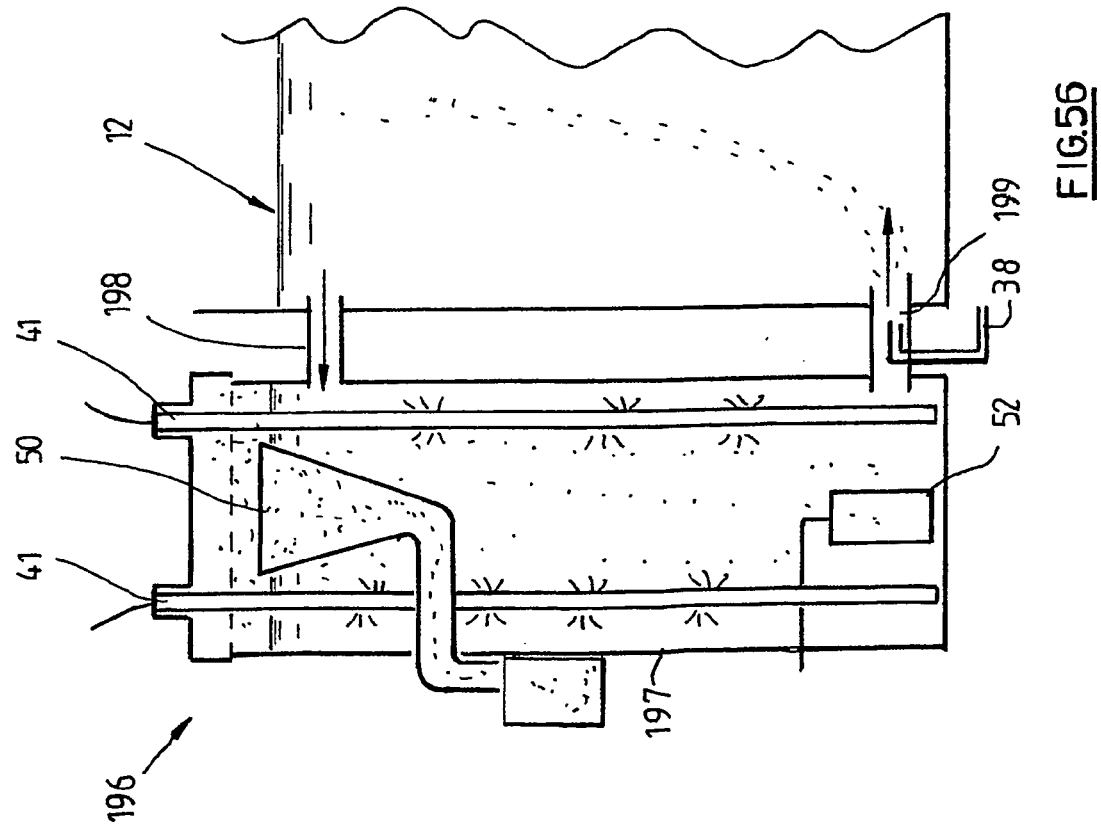

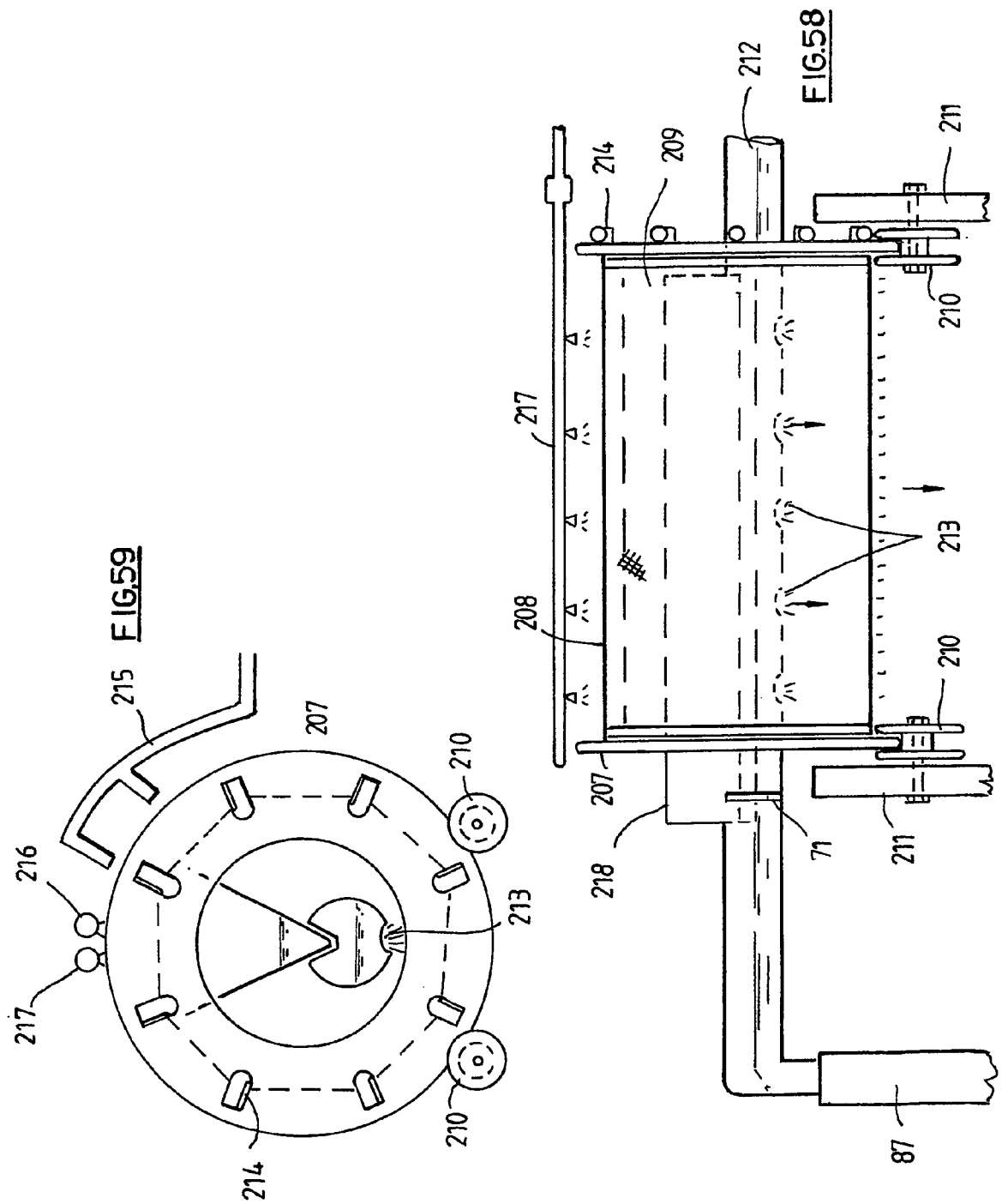

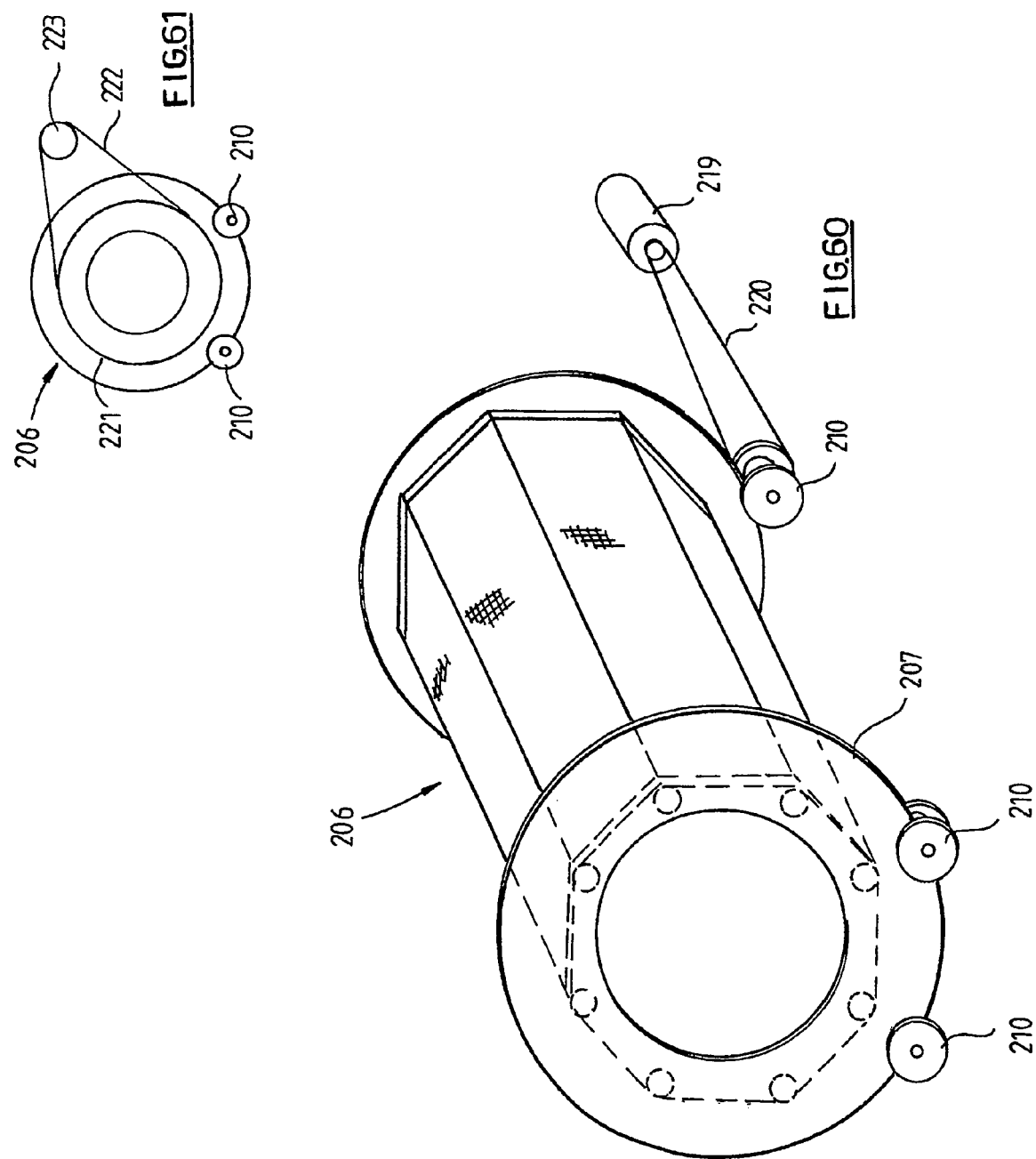

AQUACULTURE SYSTEM

TECHNICAL FIELD

This invention relates to aquaculture systems for growing fish, prawns or other marine invertebrates. The present invention also relates to water treatment components used in aquaculture systems.

BACKGROUND ART

Aquaculture has commonly been conducted by growing fish, prawns and other marine invertebrates in outdoor ponds. The ponds however eventually become polluted because faeces, uneaten food and algae work their way to the bottom of the ponds. This makes the ponds almost impossible to clean. In addition large quantities of valuable water are required to keep these systems functional. Other disadvantages are also associated with outdoor aquaculture systems. For example pests can eat stock, adverse weather conditions such as floods can cause stock loss by washing the stock away and very hot weather can cause growth of algal blooms which can kill the stock. In addition in very hot or very cold weather, the stock will stop growing. Muddy waters or disturbed water can also cause the stock to have an unpalatable taste.

In order to overcome the above disadvantages, indoor commercial aquaculture systems were introduced where fish or other marine invertebrates are grown in tanks placed in large buildings or sheds. Such systems have a number of advantages. In particular, there is a continuing circulation of the water around the system with the addition of approximately 10 percent of its water volume each week unlike in outdoor ponds where water is pumped in and then overflows back into streams and rivers causing added pollution. In the indoor systems, the water temperature is attempted to be controlled by either heating the water with probes placed into the water or by installing large chillers and pumping the water and through the chillers to cool it to the desired temperature to promote fast fish growth. The temperature control equipment is relatively expensive in capital cost and also running costs can be high. An alternative is to control air temperature, however as the tanks and associated equipment make up less than 20 percent of the air area within the building or shed, to have effective water temperature control, very large energy absorbing equipment would in most cases have to be used. Further, the buildings or sheds would have to be fully insulated to be viable and this would mean an impractical cost in relation to returns.

A further disadvantage of the known systems is that the buildings or sheds housing the aquiculture system resemble a maze of pipes and plumbing as water is pumped between the system components such as tanks, filters, biological filters, foam fractionators, ultraviolet water treatment units and other water treatment components. These components are individual components which have to be set up in different parts of the building. Drainage pipes are provided on the floor and water pipes are connected to each individual tank or component. One of the major problems with these system is that with a large number of pipes interconnecting the components, vibration in the pipes or simply the suspension of pipes can creates stresses causing pipe joints to fail and/or pipe fracture. If such a failure occurs, water from the tanks is quickly lost resulting in the loss of tonnes of fish stock. Further wherein there is a large volume of exposed piping, water temperature losses occur in cold climates and water temperature increases occur in hot climates resulting in massive increases in the electricity costs for cooling or heating the water. This has in many cases made the indoor systems commercially unviable. Another disadvantage which arises is that fish often attempt to jump out of the tanks so additional piping has to be placed over the top of the tanks and then covered with netting to prevent fish losses.

With regards to the individual components, if ultraviolet water treatment units are installed, they are installed into the main water flow pump line which reduces flow thus increasing the electricity consumption. In the foam skimmers or foam fractionators which are used in the conventional systems, insufficient bubbles or foam is created or forced out of the top of the units. If insufficient bubbles or foam is created, the fractionators simply do not function. To make them function correctly, high pressure high energy pumps fitted with air venturis are employed but these do not always overcome the problem of inefficient operation.

Drum filters have been a part of the aquaculture systems for filtering the water of fine waste particles created from waste food, faeces, and other extraneous matter. The majority of filters are electric motor driven off central drive shafts with bearings on which the drum filter is supported for rotation. In most cases the cleaning takes place through a centre mounted vertical disc through which the water must pass. The drum filters are separate units and include an outer housing which is specifically designed to hold the filter and its supporting components and to also hold the water. Water inlets and outlets must also be provided along with special float switches to activate a cleaning process when the water level rises.

As a general rule, during cleaning the water flow is stopped or bypassed which allows uncleaned water back into the fish tanks. If the water is stopped for any length of time, it can be very detrimental to the fish stock as in times of heavy stock loading, the fish can only stay alive for around six minutes before fatalities begin to occur. Another major drawback is that if a bearing or another major mechanical failure happens, removal the drum filter and all of the fittings is extremely time consuming and in many cases can lead to total stock losses. Cleaning of the current drum filters in any event is difficult as easy access cannot be had to the interior of the drum.

SUMMARY OF THE INVENTION

The present invention aims to provide an improved aquaculture system which overcomes or at least alleviates one or more of the above disadvantages. The present invention also aims to provide an aquaculture system which incorporates improved water treatment components. Other objects and advantages of the invention will become apparent from the following description.

The present invention thus provides in a first preferred aspect, a self-contained aquaculture system comprising a modular building, said building having a base section, a main water chamber for containing fish or other marine invertebrates formed within said base section, said building further having a top section covering at least said main chamber and defining an enclosed space above said main chamber, water treatment means within at least said base section of said building and adjacent said main chamber for treating water from said main chamber, means for circulating water for flow from said main chamber through said water treatment means and back to said main chamber, and means for controlling the air temperature within said enclosed space.

The base section suitably has outer side walls and at least one of the side walls of the base section defines a side wall of the main chamber. The top section or sections may includes a roof and side walls, and the side walls of the top section are suitably aligned with the side walls of the base section.

Preferably, the base section is moulded from a mouldable material with the at least the main chamber integrally moulded within the base section.

The water treatment means suitably includes filtering means for removing larger particles or solids from water in the main chamber and for removing smaller particles from the water. The filtering means suitably includes a primary filter for removal of large particles and a secondary filter for removing smaller particles The primary filter suitably comprises a second chamber which is located adjacent to, and receives water from the main chamber. Preferably first communication means connect the base of the main chamber to the second chamber whereby solids gathering in the base of the main chamber may pass into the second chamber. Second communication means may also connect the main chamber adjacent the water level therein to the second chamber whereby water and solids may flow from the top level of water in the main chamber into the second chamber. Preferably the second means comprises a spillway between the main chamber and second chamber. The water level in the second chamber is suitably maintained at a lower level than the level in the main chamber such that water will flow under the influence of gravity from the main chamber to the second chamber via the first and second communication means such that heavier and lighter solids collecting at the bottom and top of the main chamber pass into the second chamber. Preferably the second means opens to the periphery of the second chamber such as to impart a swirling movement of water in the second chamber to assist in drawing water and solids from the main chamber into the second chamber. The second chamber may include a drain outlet which may be selectively opened for example under the control of a manual or automatic valve to dump solids from the second chamber.

The second filter suitably comprises a screen filter for receiving and filtering water from the primary filter. The secondary filter suitably comprises a drum filter. The drum filter suitably comprises a rotatable drum filter having a screen or mesh material about its periphery and means are provided for conveying water from the second chamber of the primary filter to pass through the screen or mesh material. Suitable means are provided for supporting and rotating the drum filter. Such means may comprise motor means for causing rotation of the drum filter. Preferably however the drum filter is driven in rotation by water flowing in from the primary filter. The drum filter for this purpose may include a plurality of circumferentially spaced members and the conveying means may include one or more water outlets adjacent the ribs to cause rotation of the drum filter. Most preferably, the drum filter is hollow and water from the primary filter conveyed internally of the drum filter to effect rotation thereof. Preferably, the circumferentially spaced members of the drum filter may comprise longitudinally extending ribs against which water from the primary filter acts to effect rotation of the drum. The ribs suitably support the filter screen or mesh material which extends circumferentially. The drum filter may comprise a pair of circular or annular end members between which the ribs extend and the end members may be supported on rollers for supporting the drum filter for rotation about a horizontal axis. The means for directing water from the primary filter into the drum filter suitably comprises a feed duct extending from the second chamber and longitudinally within the drum. The height of the feed duct determines the level of water in the second chamber as water cannot rise in the second chamber above the feed duct. The duct may include generally radially extending duct members having outlets for directing water against the ribs. The duct may include a baffle beyond the duct members to prevent water passing out of the drum filter.

Means are suitably provided for cleaning the filter screen or mesh material. The cleaning means may comprise means for spraying water against the screen or mesh material. Alternatively or additionally, the cleaning means may comprise means for applying pressurized air against the filter screen or mesh material. The means for applying water and/or air against the screen or mesh material may be located above the drum and means may be provided internally of the drum beneath the water and air applying means for catching and collecting materials dislodged from the filter screen or mesh material and water. The means for catching dislodged material and water may comprise a hopper internally of the drum. The hopper may communicate with a waste line for directing those materials to waste. Suitably, the hopper communicates with an extending portion of the supply duct beyond the baffle which is connected or communicates with waste. Means may be provided to collect solids in the extending portion of the supply duct. The hopper may extend beyond one or opposite ends of the drum to ensure that substantially all material dislodged from the drum is collected.

The drum filter is suitably supported over a third chamber such that water passing through the drum filter collects therein. The third chamber may include a submerged biological filter media to define a first biological filter for biological contact and action on the water therein which has passed through the drum filter. The third chamber may be divided into separate sections by suitable baffles, each section preferably containing a biological filter medium. An end section of the third chamber however is preferably free of the biological filter medium and pump means may be located therein for supplying water to the drum filter spraying means. The pump means may be operated at regular intervals under timer control. The third chamber may include one or more outlets which may be selectively or automatically opened through a valve or valves to waste for draining the third chamber.

Means such as one or more pumps may be provided to convey water in the third chamber to a second biological filter. The one or more pump means may be located in the end section of the third chamber. The one or more pumps serve to circulate water through the system and maintain the level of water in the third chamber beneath the level of water in the second chamber. An overflow drain may be provided in the third chamber to dump water from the chamber if it rises above a predetermined level.

The second biological filter suitably comprises a fourth chamber which carries a biological filter media. The fourth chamber may be divided into sections by baffles with each section carrying the filter media. Water from the third chamber is suitably distributed such as by spraying over the biological filter media. Water from the third chamber may be sprayed over the biological filter medium through spray bars at the upper end of the chamber. The spray bars may be fixed spray bars or rotatable spray bars. To increase biological action, means may be provided to supply air to the fourth chamber for flow through the biological filter media in a direction opposite to the water flow therethrough. Preferably, the air is supplied to the fourth chamber to flow upwardly against the water flowing downwardly through the biological filter medium. The air may be supplied to one or more air supply ducts arranged at a lower level within the chamber. Means suitably in the form of one or more ducts may be provided to communicate water in the fourth chamber back to the main chamber.

In a further embodiment, the biological filter action may be achieved by a biological contactor in the main chamber. The biological contactor may comprise a rotatable member which rotates with movement of circulating water flow in the main chamber and support a biological filter medium therein.

At least one foam fractionator is suitably provided for treatment of water in the main chamber. The foam fractionator preferably comprises a fifth chamber formed in a wall of the main chamber and means are provided for supplying air to a lower portion of the fifth chamber for bubbling through water therein. Air is suitably supplied to one or more air blocks in the lower portion of the chamber. An inlet for water from the main chamber is suitably provided at the upper end of the fifth chamber. An outlet from the fifth chamber is suitably provided at a lower end of the fifth chamber, the outlet communicating with the main chamber through a return line. Air may be supplied to the return line to assist in water flow back to the main chamber. The return line suitably includes a portion within the main chamber which extends in a direction to assist in circulating flow of water in the main chamber. The return line portion in the main chamber may be apertured to allow controlled escape of air in the form of bubbles from the return line. The fifth chamber suitably includes a funnel member at or adjacent the upper level of water in the fifth chamber for collecting waste entrained in bubbles at the surface of the level of water. The funnel member is suitably connected to waste. The funnel member may be adjustably supported for height variations within the chamber of the foam fractionator. Alternatively, the funnel member may be supported by a float or floats at or adjacent the level of water in the foam fractionator chamber.

Water may be supplied from the main chamber to the inlet to the chamber of the foam fractionator through an ultraviolet treatment chamber where water from the main chamber is subject to exposure to ultraviolet light. The ultraviolet treatment chamber which is also preferably located in the wall of the main chamber suitably has an inlet at its lower end communicating with the main chamber and contains a removable ultraviolet light source.

One or more ozone reactors may be provided for supplying ozone to water in the chamber of the foam fractionator. The ozone reactor may be provided in a sixth chamber in the wall of the main chamber. Ozone from the ozone reactor/s may be supplied to the lower end of the foam fractionator chamber to bubble upwardly through that chamber. Ozone may be supplied to an air block submerged in the chamber.

Air for supply to the foam fractionator and the further biological filter is suitably provided by one or more air pumps which pump air from within the building module at the internal building temperature through the fractionator and biological filter to thereby control the temperature of water therein and thus in the main chamber.

The fourth chamber of the further biological filter is suitably is defined by a tank. The tank may be supported above the main chamber such that water from the main chamber flows under the influence of gravity back into the main chamber. In an alternative configuration, the biological filter tank may be arranged adjacent to the main chamber.

Air conditioning means may be provided to control the temperature and humidity within the enclosed space of the building module and thus the temperature of air supplied to the foam fractionators and biological filter chamber. A controllable light source such as one or more lamps may be provided above the main chamber to create artificial day and night conditions within the building module.

In one embodiment, the second and third chamber may be provided adjacent one end of the main chamber and the space above the main chamber and second and third chambers may be enclosed to control the temperature within the building module. Means may be provided for communicating the space above the main chamber with the space above the second and third chamber. The air conditioning means may be provided to communicate with the space above the main chamber to control the temperature in that space and thus the climate in the space above the second and third chambers. Alternatively, the air conditioning means may be provided to communicate with the space above the second and third chambers.

The main chamber and the second and third chambers may be in many different configurations. In one configuration, the main chamber is of a substantially rectangular or square configuration. One or more corners of the rectangular or square main chamber may be truncated and the foam fractionators and where provided associated ultraviolet treatment chambers and ozone reactors may be located in the truncated corners of the chamber or in a wall of the main chamber. In another form, the main chamber is of elongated configuration and a central divider is provided therein such that flow circulates around the central divider. Primary and secondary filters may be provided at one or both ends of the main chamber. The central divider may support one or more foam fractionators and where provided associated ultraviolet treatment chambers and/or ozone reactors. Alternatively, the foam fractionator/s and where provided associated ultraviolet chambers and/or ozone reactors provided at one or both ends of the main chamber.

The building module defining the aquaculture system of the invention may be constructed in many different configurations. For example, the main chamber, and second and third chambers may be formed as one unit such as by being moulded from concrete, glass reinforced plastics or other mouldable material with the biological filter tank formed as a separate moulding or unit. One or more roof and wall sections which cooperate with the biological filter tank to define an enclosed space over the main chamber and second and third chambers may be formed as separate mouldings or units. The separate mouldings or units may be assembled and joined to define the building module of the aquaculture system. The roof and wall sections may be provided with one or more access openings providing selected access to the interior of the building module as required.

In another configuration, the main chamber, second and third chambers and biological filter chamber may be formed in a single lower base molding or unit with an upper roof and wall moulding or unit covering and enclosing the chambers. The lower base moulding or unit may be extended at one or both ends from the chambers to define access areas to the system. In another configuration, the biological filter tank may be formed as a separate moulding or unit which extends to the full height of the building module with the space over the main chamber, second and third chamber being enclosed by a roof and wall section. In yet a her configuration, each chamber may be moulded as a separate unit with the units being assembled by being abutted against each other. A roof and wall section may then be provided to cover and enclose the assembled chambers.

In yet a further configuration, one or more biological filter tanks may be provided to one or both sides of the main chamber and second and third chambers which are covered by and enclosed by a roof and wall section. The biological filter tanks may have separate roof or lids providing access thereto.

The roof of the building modules may be flat which permits the modules to be stacked one above the other to form a multi-level building.

In a further preferred aspect, the present invention provides a self-contained aquaculture system comprising a modular building, said building having a base section, a main water chamber for containing fish or marine invertebrates formed within said base section, a second swirl chamber comprising a primary filter formed in said base section adjacent said main water chamber, means communicating said main chamber with said second chamber for removing solids from water in said main chamber, fine filtering means comprising a secondary filter for receiving water and filtering water from said second chamber, a third biological filter chamber formed within said base section adjacent said second chamber for receiving water from said fine filter means, said building module further including a top section or sections covering said main water chamber and said second and third chambers and defining an enclosed space or spaces over said chambers, means for circulating water for flow from said main chamber through said second chamber, fine filtering means and said third chamber back to said main chamber, means for controlling the air temperature within said enclosed space or spaces.

BRIEF DESCRIPTION OF THE DRAWINGS

In order that the invention may be more readily understood and put into practical effect reference will now be may to the company drawings which illustrate the preferred embodiments of the invention and wherein:

FIG. 1 illustrates in perspective view, a building module defining an aquaculture system according to a first embodiment of the present invention;

FIG. 2 is a sectional elevational view of the building of FIG. 1;

FIG. 3 is a plan view of the base section of the building of FIG. 1 with the position of the biological filter tank shown in dotted outline;

FIG. 4 illustrates the building of FIG. 1 with the end flaps open;

FIG. 7 is a perspective view of the drum filter for use in the system and its manner of support;

FIG. 9 is an end view in the direction A of FIG. 8;

FIGS. 11, 12 and 13 illustrate in exploded schematic end view, top view and side view respectively the components of the aquaculture system of FIG. 1 and the plumbing therebetween;

FIG. 14 illustrates different possible orientations of the biological filter;

FIGS. 15 to 17 illustrate in plan view, the aquaculture system with different orientations of biological filter as in FIG. 14;

FIGS. 18 and 19 illustrate in perspective and sectional plan views an alternative building module defining an aquaculture system in accordance with a further embodiment of the invention;

FIGS. 20 to 25 illustrate in different views an alternative building module configuration defining an aquaculture system in accordance with a further embodiment of the invention;

FIGS. 26 to 28 illustrate the manner in which the building module of FIGS. 1 to 4 can be provided with add on end sections;

FIG. 29 is an exploded view of a building module with end sections;

FIGS. 30 and 32 illustrate in side perspective, exploded and sectional plan views a building module defining an aquaculture system in accordance with a further embodiment of the invention;

FIGS. 33 and 35 illustrate in exploded, sectional plan views and perspective views a building module defining an aquaculture system in accordance with a further embodiment of the invention;

FIGS. 36 to 39 illustrate the manner in which a number of system components can be assembled to form an aquaculture system in a building module in accordance with a further embodiment of the invention;

FIGS. 42 to 49 illustrate further embodiments of building modules defining an aquaculture system in accordance with the invention;

FIGS. 50 and 51 illustrate in side and sectional plan view an elongated building module defining an aquaculture system in accordance with a further embodiment of the invention;

FIGS. 52 and 53 illustrate in side and sectional plan view an elongated building module defining an aquaculture system in accordance with a further embodiment of the invention;

FIGS. 54 and 55 illustrate in side and sectional plan view an elongated building module defining an aquaculture system in accordance with a further embodiment of the invention;

FIGS. 56 and 57 illustrate in sectional view further forms of foam fractionator for use in the aquaculture systems of the invention;

FIGS. 58 and 59 illustrate in side and end views a further embodiment of drum filter for use in the aquaculture system of the invention; and FIGS. 60 and 61 illustrates alternative drive system for the drum filter.

DETAILED DESCRIPTION OF THE PREFERRED EMBODIMENTS

Figure 5:
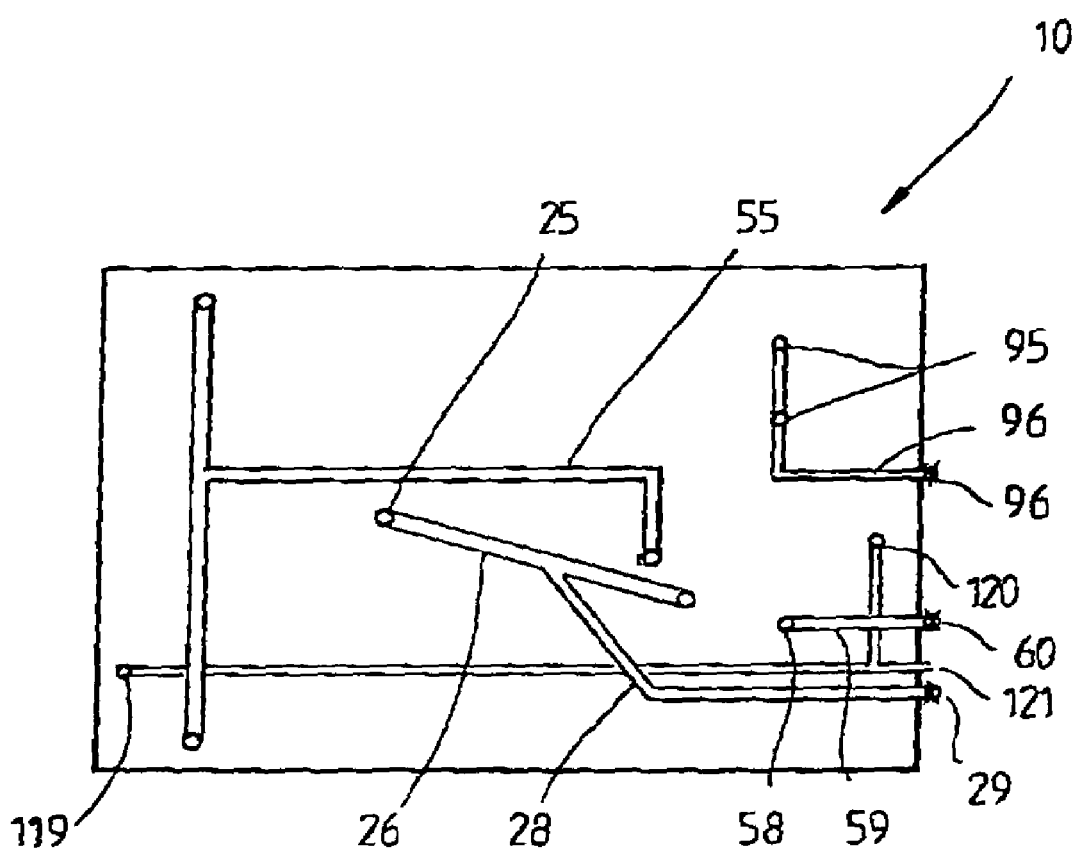
FIG. 5 illustrates the layout of the plumbing pipes of the system incorporated in the base or foundation of the building module.

Referring to the drawings and firstly to FIGS. 1 to 4, there is illustrated an aquaculture system 10 in accordance with an embodiment of the invention in the form of a modular building 11 comprising and defining a main water chamber 12 for holding fish or marine invertebrates, a swirl chamber 13 which serves as a primary filter and a biological filter/ drum or screen filter chamber 14 of a secondary filter. The chambers 12, 13 and 14 have their bases at substantially the same level; however the water level in each chamber is controlled such that the level in chamber 14 is less than the level in chamber 13 and the level in chamber 13 is less than the level in chamber 12. This then allows flow of water from the main chamber 12 to the swirl chamber 13 and then to the chamber 14 under the influence of gravity without pumping. The building module 11 also is defined by a biological filter tank 15 which is elevated and located above the main chamber 12. Opposite end integral hip roof and wall sections 16 and 17 comprising top or upper sections of the building module 11 extend from opposite sides of the tank 15 and over the main chamber 12, and swirl chamber 13 and filter chamber 14 respectively to define enclosed air spaces over the main chamber 12 and chambers 13 and 14. The building 11 may be constructed of any suitable materials such as steel, timber, fiberglass or any other mouldable materials, or any other materials however the preferred material of construction is concrete suitably a concrete which is waterproof and provides sufficient strength to the building 11 and additionally has high insulation properties such that no additional insulation is required and further facilitates moulding of the tank 15 and chambers 12, 13 and 14. The main chamber 12 and chambers 13 and 14 may be formed as one moulding in a base section indicated generally at 18 which defines the external periphery of the building module 11, and the tank 15, and roof and wall sections 16 and 17 as separate mouldings which are then assembled and joined to the lower moulding 18. Opposite end walls of the tank 15 and the side walls of the room and wall sections 16 and 17 are thus aligned with the opposite side walls of the base section moulding 18 and the outer end walls of the roof and wall sections 16 and 17 are aligned with opposite end walls of the base section moulding 18 to form the modular building 10. The opposite end walls of the roof and wall sections 16 and 17 are provided with hinged panels 19 which may be pivoted upwardly as shown in FIG. 4 to provide access at one end to the chamber 12 or at the other end to the chambers 13 and 14. The biological filter tank 15 is also closed by upper lid panels 20 which are hingedly mounted by central hinges 21 to enable them to be lifted to provide access to the interior of the tank 15. It will be apparent that when the panels 19 are closed, fully enclosed air spaces are defined over the chambers which facilitates control of air and water temperature as described further below.

The main chamber 12 is of a generally rectangular or square configuration having side walls 12' which also comprise the side walls of the base section moulding 18 with the inner corners at the junction of adjacent walls 12' being truncated as at 22. A spillway 23 is provided on one side of the chamber 12 and at an elevated location to convey water in the chamber 12 above the level of the spillway 23 into the swirl chamber 13. This acts as a skimmer to remove any floating scum or other materials from the surface of the water in the chamber 12. A screen 24 of mesh-like form is provided across the spillway 23 to prevent fish from escaping from the main changer 12 into the swirl chamber 13. The main chamber 12 also includes a central drain outlet 25 which communicates through a passage 26 in the floor of the main chamber 12 with the periphery of the base of the swirl chamber 13 at 27 which directs water from the chamber 12 into the chamber 13 in a generally circumferential direction such as to effect anti-clockwise swirling motion of water in the chamber 13. The passage 26 carries fish and food waste from the main chamber 12 into the swirl chamber 13 without the use of pumping equipment which may breakup particles within the chamber 12. The passage 26 may also have a branch line 28 through which water may be drained from the chamber 12 under the control of a valve 29 externally of the building module 10 (see FIG. 5), the passage 26 and branch line 28 comprising pipes encapsulated in the floor slab of the building module.

Figure 6:
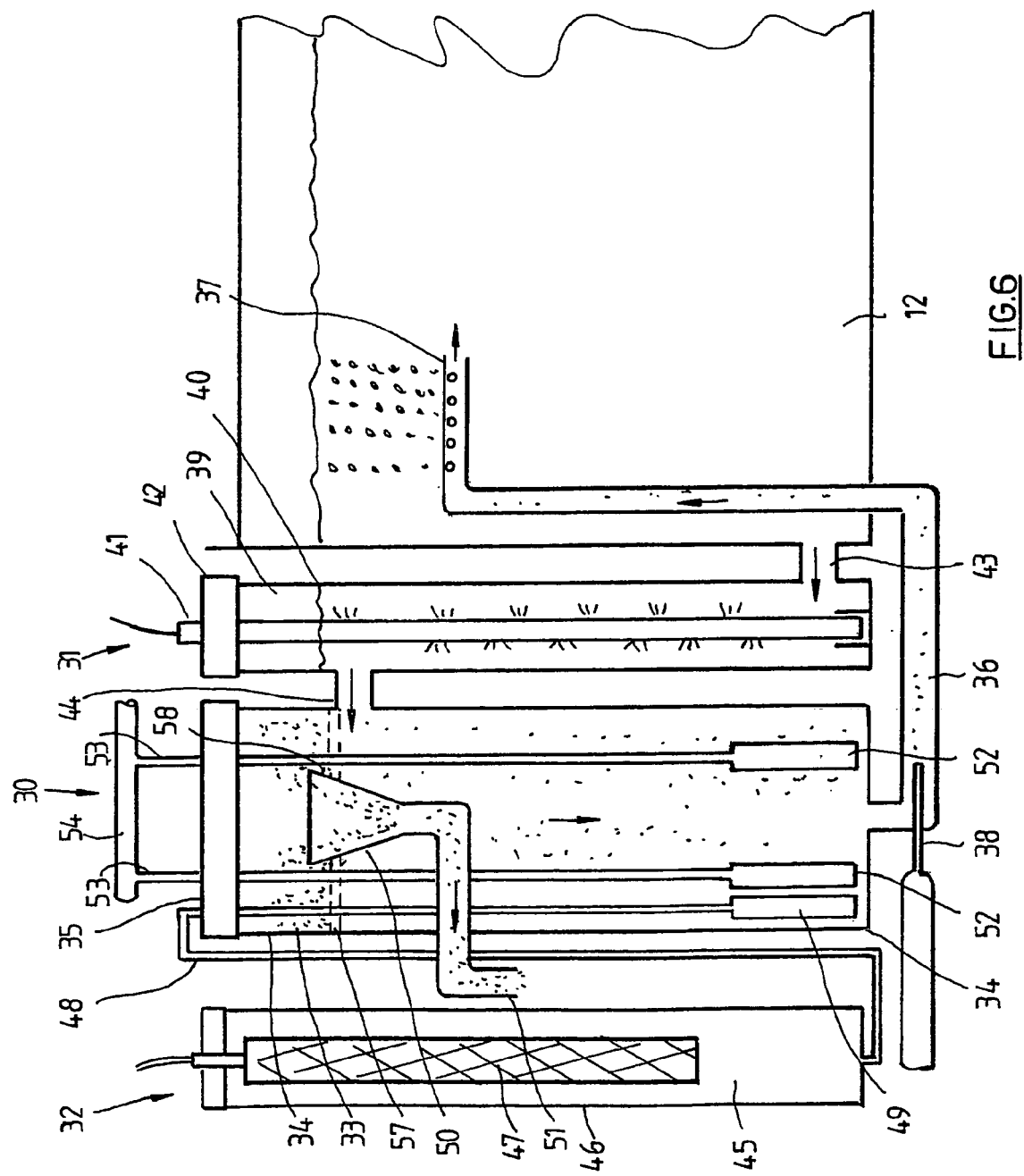
FIG. 6 illustrates in sectional view the foam fractionator and associated ultraviolet and ozone generator units as used in the system of FIGS. 1 to 4.
Figure 8:
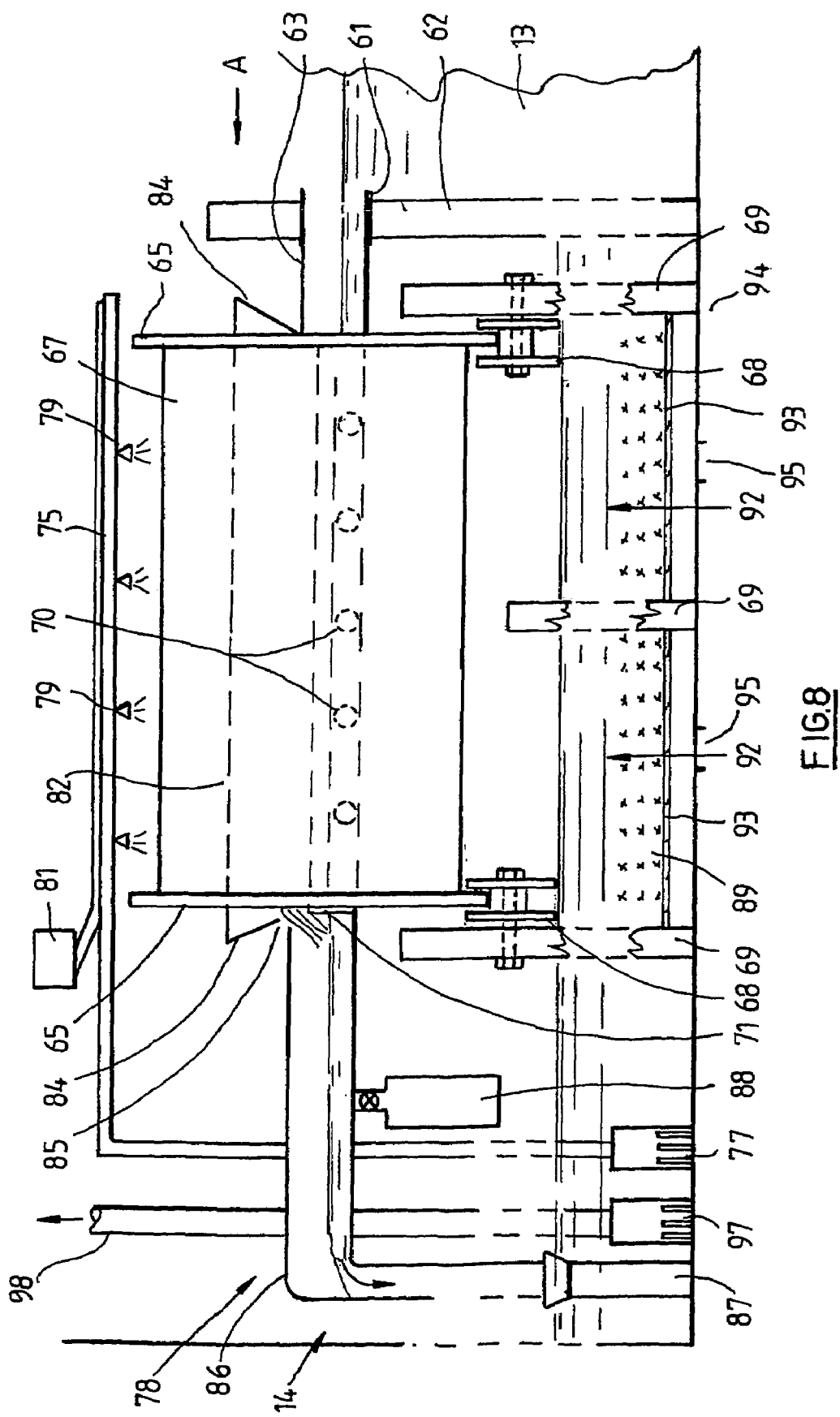
FIG. 8 is a side view showing the drum filter and associated feed, discharge and cleaning components.
Figure 10:
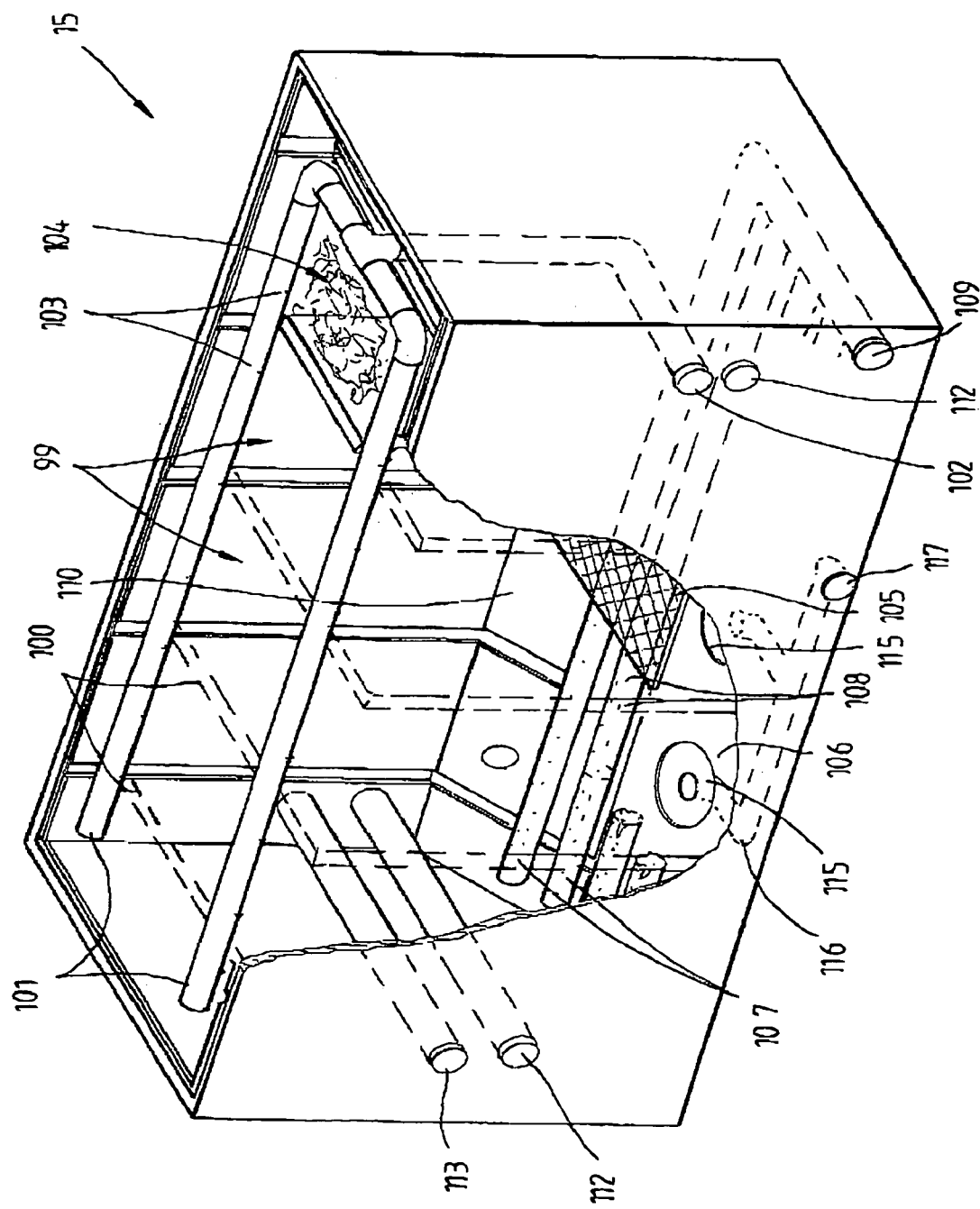
FIG. 10 is a cut away view of the biological filter tank.

The main chamber 12 also includes in the outer pair of truncated corners 22, a pair of foam fractionators 30 for oxygenating and cleaning the water in the main chamber 12. Associated with each foam fractionator 30 is an ultraviolet unit 31 for killing pathogens in the water and optionally one or more ozone reactor or generator units 32 for introducing ozone into the water in the fractionator 30 for sterilizing the water. The foam fractionator 30 as more clearly shown in FIG. 6 includes a chamber 33 moulded or incorporated into a corner 22 in an upright attitude. The chamber 33 may be formed by a tubular pipe 34 having an upper end which extends above the corner 22 and which is closed by a removable cap 35. A return line 36 connected to the bottom of the chamber 33 extends upwardly and then through the wall of the chamber 12 and terminates in an outward flow duct 37 (see also FIG. 2) which extends in a generally circumferential direction relative to the tank 12. An air inlet 38 into the return line 36 at the lower end thereof directs a flow of air into the line 36 to assist in the flow of water back into the chamber 12. The duct 37 may be apertured to allow controlled escape of air into the chamber 12 in the form of air bubbles.

The chamber 33 communicates with the main chamber 12 via the ultraviolet unit 31 which has a chamber 39 which may also be defined by a tubular pipe 40 and which houses an elongated ultraviolet light generator 41 which is removably mounted in the chamber 39 by means of an end cap 42 engaged with the upper end of the pipe 40. A duct 43 communicates the lower end of the chamber 39 with the main chamber 12 and a further duct 44 communicates the upper end of the chamber 39 with the chamber 34. Thus the level of water in the chambers 33 and 39 is the same as the level of water in the chamber 12 and water before passing into the chamber 33 is exposed to ultraviolet light.

The ozone generator unit 32 also includes a chamber 45 which is also defined by a tubular pipe 46 located in an upstanding attitude in a tank corner 22 and which houses an ozone reactor or generator 47. An outlet duct 48 passes upwardly from the bottom of the chamber 45 and then downwardly in the chamber 33 to terminate in an air stone 49 to inject ozone into the water in the chamber 33 for passage as bubbles upwardly through water in the chamber 33 to expose the water therein to ozone.

A drain cone or funnel 50 is provided in the chamber 33 and is connected to a drain pipe 51 which leads outwardly of the chamber 33 to waste or for collection in a container if desired. Air for creating bubbles in the chamber 33 is supplied to the lower end of the chamber 33 to air stones 52 which are suspended via air supply ducts 53 connected to an air supply manifold 54 above the chamber 33. Air is supplied to the air manifolds 54 via piping 55 in the slab of the building 11 (see FIG. 5) connected to an air pump 56 in the air space in the building module 11 within the roof and wall section 17 (see FIG. 56).

Thus water for treatment in the chamber 33 initially passes via duct 43 through the ultraviolet chamber 39 where it is exposed to ultraviolet light from the generator 41 which will destroy pathogens in the water and then the water passes through the duct 44 into the chamber 33. Air supplied to the air stones 52 via the ducts 53 exits as bubbles in the water which pass upwardly through the chamber 33 against the flow of water circulating through the chamber 33 in the opposite direction for flow through the return line 36 back to the chamber 12. Bubbles passing upwardly through the chamber 34 carry dirt and fat particles or other impurities in the water to the surface. In addition, the ozone reactor or generator unit 32 creates bubbles of ozone which also pass upwardly through the chamber 33 to sterilize and clean the water.

Bubbles upon reaching the surface of the water will froth up and create foam which flows into the drain funnel 50 carrying the dirt and fat particles through the drain pipe 51 to waste. The height of the drain funnel 50 can be adjusted to vary the extent to which bubbles are discharged and for this purpose may be supported adjustably on brackets 57. Alternatively, the drain funnel 50 may be attached to floats 58 to support the funnel 50 at or adjacent the level of water within the chamber 33. The foam is thus collected just above the water level and flows out through the funnel 50 under the influence of gravity. Water flowing outwardly from the chamber 33 and into the chamber 12 via the duct 36 and duct 37 creates a circulating flow of water in the chamber 12 in an anti-clockwise direction (FIG. 3).

As the system 10 operates under low pressure, the foam fractionator 30 can be cleaned without stopping operation of the system 10 and similarly, the ultraviolet light generators 41 can also be removed for replacement of bulbs or repair whilst the system 10 continues to run. The ozone generator unit 32 can also be serviced whilst the system is operating. This is facilitated by having the foam fractionator 30, ultraviolet unit 31 and ozone generator unit 32 arranged to one side of the chamber 12 in a truncated corner 22 or a wall of the chamber 12 and thus out of the main flow of water.

The swirl chamber 13 is of a generally hexigonal shape to assist in the swirling of water flow and receives water through the spillway 23 from the main chamber 12 which carries floating waste into the chamber 13. The spillway 23 enters the chamber 13 at the periphery thereof and at a generally tangential orientation to induce into the chamber 13 a circulating or swirling flow. The outlet 27 which communicates with the base of the chamber 12 through passage 26 also is directed generally circumferentially or tangentially to induce swirling of flow of water in the chamber. As the water level in the chamber 13 is below that in the chamber 12, water will flow from the chamber 12 into the chamber 13 from the top and bottom thus carrying wastes into the chamber 13. The swirling flow of water will cause heavy particles fish and food waste to collect centrally at the base of the chamber 13. A waste outlet 58 is provided centrally in the base of the chamber 13, the waste outlet 54 being connected by a duct 59 within the building floor slab and valve 60 to waste (see FIG. 5), the valve 59 being opened at regular intervals to allow heavy particles to be discharged.

A water outlet 61 extends through a side wall 62 of the chamber 13 to direct water from the chamber 13 into the filter chamber 14, the wall 62 being common to both chamber 13 and chamber 14. The outlet 61 is below the level of the spillway 23 and thus sets the normal level of water in the chamber 13 below the level in the main chamber 12. A feed pipe 63 is releasably coupled to the outlet 61 through a male/female connection and extends centrally and coaxially through a drum filter 64 for the fine filtering of the water flowing in from the swirl chamber 13. The drum filter 64 as more clearly shown in FIG. 7 includes a pair of annular end members 65 joined by a plurality of longitudinally extending ribs 66 which are spaced around a circumferential line arranged midway between the inner and outer diameters of the annular members 65. The ribs 66 which comprise flat strip-like members have their major dimension lying in substantially radially extending planes as is apparent in FIG. 9 and support a fine filtering screen or mesh 67 which is wrapped circumferentially around the ribs 66 and which is secured to the ribs 66 such as by stapling. Each annular end member 65 is supported by and run in a pair of free running grooved guide wheels 68 which are rotatably mounted to a cradle or baffles 69 in the chamber to support the drum filter 64 for rotation about a substantially horizontally axis which extends longitudinally of the drum filter 64.

The incoming water through the feed pipe 63 as well as being fed to the drum filter 64 for filtering is also used to rotatably drive the drum filter 64. For this purpose, a series of spaced apart radial ducts 70 extend from the feed pipe 63 and open adjacent the ribs 66. A baffle 71 in the feed pipe 63 prevents water passing straight through the pipe 63. When water flows into the feed pipe 63 and out through the ducts 70 as at 72, it applies a force to the respective ribs 66 to thereby cause rotation of the drum filter 64. In addition, water flowing out of the ducts 70 is filtered for passage through the filter screen 67 as at 73. The end members 65 define through their annular configuration an inner annular lip 74 spaced radially inwardly of the filter screen 64. The lip 74 prevents any water from running out of the open ends of the drum filter 64 before passing through the screen material 67. In the extreme case of the water level rising within the drum filter 64, it cannot jam up the drum filter 64 by over filling as it will simply cascade over the end lips 74 and thus will not prevent the drum filter 64 from rotating.

For cleaning of the filter screen 67, a pair of ducts 75 and 76 are provided above the drum filter 64 to extend longitudinally thereof. One duct 75 is connected to a water pump submerged in an end section 78 of the chamber 14 and has a plurality of spaced nozzles 79 through which water can be directed towards the screen 67 to wash the screen 67. The other duct 76 is also provided with a plurality of spaced nozzles 80 and is connected to an air pump 81. Timers are associated with the water pump 77 and air pump 81 to operate the pumps at regular intervals to force pressurised water and air through the nozzles 79 and 80 and impact against the screen 67 to clean materials gathering on the screen 67. Materials displaced from the screen 67 are collected in a waste collecting trough 82 which is of a hopper-like V-shaped cross section and which is arranged to extend within the drum filter 64 and centrally thereof beneath the cleaning water and air ducts 75 and 76. The waste collector trough 82 receives materials displaced from the filter screen 67 along with the water forced through the screen 67. The waste collector trough 82 sits within a longitudinally extending slot 83 in the feed pipe 63 and projects out of each end of the filter drum 64. The opposite ends 84 of the trough 82 are flared outwardly in a funnel-like configuration to catch all materials washed from the drum filter 64. The end 84 adjacent the section 78 of the chamber 13 extends beyond the baffle 71 and has an opening 85 therein which allows water and fine materials to be discharged into an extended portion 86 of the feed pipe 63 beyond the baffle 71. The end of the extending portion 86 of the feed pipe 63 directs the collected waste into a drain pipe 87 which also serves as an overflow drain if the level of water in the chamber 13 exceeds a predetermined level.

The cleaning ducts 75 and 76 provide the advantage of enabling cleaning of the filter screen 67 while the drum filter 64 it is running at fulfill capacity without stopping of water flow, or for any need to bypass the system. As the drum filter 64 rotates, air or water or both dislodges any fine material clogging the screen 64 and blows or forces it into the V section collector trough 82 for passage into the feed pipe section 86 and then to the drain pipe 87. Water flowing into the drain pipe 87 may be simply discharged to waste. Optionally, a filter bag 88 may be connected to the pipe section 86 via a valve for collecting fines and filtering the collected waste water. The bag 88 may be removed and cleaned or replaced at regular intervals or when clogged or filled with waste. Alternatively or additionally a filter device may be provided in the drain pipe 87 so as to enable waste water to be recycled.

The drum filter 64 may be easily removed by detaching the feed pipe 63 from the outlet 61 and when the pipe 63 is detached, the V-shaped waste collector trough 82 is also detached being supported by the pipe 63. The cleaning water ducts 75 and air ducts 76 can be simply folded down to opposite sides of the filter drum 64. After removal of the feed pipe 63 and trough 82, the entire drum filter 64 can be removed. This means that one drum filter 64 can be removed and another complete drum filter 64 installed quickly if desired.

Water filtered by the drum filter 64 and flowing through the filter screen 67 as at 73 passes to the lower portion of the chamber 14 which contains a bio-filter medium 89 to provide a surface for bacteria to live on. Typically, the bio-filter medium 89 comprises a plurality of elements upon or in which the bacteria may live. Typically the elements comprises pieces of cokes however other elements or mediums may be used. The vertical baffles 69 which are preferably detachably received in vertical slots 90 in opposite walls 91 of the chamber 14 (see FIG. 7) separate the chamber 14 into sections 92 containing the bio-filter medium 89. The bio-filter medium 89 is supported by a supporting grid 93 above the base 94 of the chamber 14. The chamber 14 is also provided with drains 95 in each chamber section 92, the drains 95 being connected to waste via a common duct 96 and valve 96' which can be opened as and when required for draining or cleaning the chamber 14 (see FIG. 5)

One or more submergible pumps 97 are provided in the end section 78 of the chamber 14 to pump water from the chamber 14 to the main biological tank 15 via a duct 98. The pumps 97 operate continuously and cause the circulating flow of water through the whole system 10 and further ensure that the water pumped out of the chamber 14 is the same or greater than water entering the chamber 14 through the feed pipe 63 to thereby maintain the level of water in the chamber 14. The pumps 97 may also be used to augment the cleaning of the screen 67 of the drum filter 64 through a branch line which can be opened to connect the pump or pumps 97 to the spraying duct 75.

The tank 15 and as shown in FIG. 12 is in this embodiment of an elongated rectangular form is separated into a number of sections 99 by a series of upright baffles 100 supported removably in grooves in the side walls of the tank 15. A pair of spray bars 101 extend longitudinally of the tank 15 and are connected to the duct 98 through a side wall of the tank 15 as at 102 to receive the water pumped from the chamber 14 by pump or pumps 97. The spray bars 101 contain a series of outlets in the form of openings 103 through which water exits to be distributed over a bio-filter medium 104 arranged in each section 99 of the tank 15. In a further form, the spray bars 101 may comprise rotatable spray bars which rotate about a vertical axis to distribute the water over the medium 104. The bio-filter medium 104 comprises a plurality of elements upon or in which the bacteria may live and which for example may be tubular elements arranged in an unordered manner within the chamber sections 99. The elements may be arranged in mesh bags to enable easy handling. The bio-filter medium 104 is supported on open racks or grids 105 arranged above the base 106 of the tank 15 and to promote bacterial action, provision is made for forcing air through the tank 15. For this purpose, the tank 15 is provided with air pipes 107 which extend longitudinally of the tank 15 and which are arranged beneath the racks 105. The air pipes 107 include a series of spaced openings 108 for the exit of air and the pipes 107 are connected at 109 to the air pump 56 through suitable connecting piping.

The base 106 of the tank 15 also includes an inclined section 110 through which one or more water outlets 111 pass from through which water from the tank 15 is returned or recirculated to the main chamber 12 (see FIG. 3). A pair of ducts 112 also pass through the tank 15 at opposite ends to communicate opposite ends of the building module 11 with each other to maintain substantially constant climate conditions within the building 11. Air fans may be provided in the ducts 112 to ensure circulation of air between opposite ends of the building module 11. A further duct 113 through the tank 15 is provided for the passage of service lines such as electricity leads. The lids 20 which close the tank 15 are provided with air vents 114 (see FIG. 1) to allow venting of gases such as carbon monoxide and carbon dioxide which are generated by the biological medium 104. The base of the tank 15 is also provided with a number of recessed drain outlets 115 for draining of the tank 15 into the waste pipe 87 in the chamber 14 via ducting 116 within the base of the tank 15 and an outlet 117 through the side of the tank 15.

In operation, water from the chamber 14 is pumped by the pumps 97 through the spray bars 101 to be sprayed through the openings 103 over the bio-filter medium 104 at the same time air at the temperature within the building module 11 is pumped by the air pump 56 through the air pipes 107 to exit through the openings 108 and pass upwardly against the flow of water over the medium 104. This serves to promote the biological filtering action of the medium 104.

To control the temperature of air within the building module 11, a reverse cycle air conditioner 118 is provided through a wall in the section 16 of the building 11 over the main chamber 12 to enable temperature within the building module to be controlled by heating or cooling. The conditioned air as well as circulating above the chamber 12 also passes through the air ducts 112 into the region above the swirl chamber 13 and drum filter chamber 14. This maintains a substantially constant temperature within the sections of the building module 11. The air conditioner 118 as well as controlling the air temperature within the building module 11 also controls the temperature of the water circulating through the system 10 as the air pumped by air pump/s 56 through the water in the foam fractionator 30 and bacterial filter tank 15 is derived from the air within the building module 11.

To maintain the level of water in the system 10 after drainage of water from the respective drains or for any other reason, the main chamber 12 includes a float controlled water outlet 119. A similar outlet 120 is provided adjacent the drain filter chamber 14. The outlets 119 and 120 are connected to a common supply line 121 (see FIG. 5) connected to a pressurised water source. Thus if there is a drop in water level within the chamber 12 or chamber 14, water is automatically topped up through the outlets 119 and 120.

All of the pipes and plumbing which convey water through the building module 11 are moulded into the base and walls of the building modules as indicated for example in FIG. 5 and sealed such that the piping cannot leak or break. Further water supply pipes which are not moulded into the base and walls are situated over the tanks or chambers themselves such that any loss of water through the pipes only leaks back into the tanks or chambers so that no water losses can occur. As all the main components are integrally moulded or joined together such that water cannot leak between them, there is a substantial reduction in plumbing. In addition, a considerable amount of the flow is through gravity thus reducing energy consumption. With the panels or shutters 19 closed, fish cannot escape as they can only hit the walls of the building module 11 and fall back into the chamber 12. Thus no netting or covering is required over the chamber 12. The shutters or panels 19 also provide weather protection when feeding fish within the chamber 12 or for other servicing operations. As the system 10 is self contained within the building module 11 and the system 10 is climate controlled, it can be placed in many different environments such as in the tropics or snow or ice and be immediately operational when connected to a power source.

The building module 11 being in modular form is portable to enable it to be relocated or located on site however it will be appreciate that the building 11 may be erected on a permanent concrete slab.

It will be appreciated that the building module 11 may be in many different configurations whilst incorporating the main components thereof arranged as shown schematically in FIGS. 11, 12 and 13 where like components of the system of FIGS. 1 to 4 have been given like numerals. FIG. 11 illustrates the drainage system where each tank or chamber can be drained to waste through suitable ducting and further indicates the different levels of water maintained within the respective chambers and tanks as governed by operation of the pump/s 97. FIGS. 12 and 13 illustrates the flow between the tanks or chambers where water in the main chamber 12 flows into the swirl chamber 13, from the swirl chamber 13 into the drum filter chamber 14 under the influence of gravity. Water is then pumped by pump/s 97 into the into the biological filter tank 15 for return to the main chamber 12 through outlets 111 to thereby establish the circulating flow through the system 11.

FIG. 14 illustrates in exploded view three possible orientations of the biological filter tank 15 relative to the main chamber 12, and filter chamber 14 and swirl chamber 13 which are arranged in reversed orientation from that shown in FIGS. 1 to 4. The resulting configurations of building modules 120, 121 and 122 are shown in FIG. 15 with the tank 12 positioned along one side of and lengthways of the building module 120 and above the main chamber 12, in FIG. 16 where the tank 15 is positioned centrally of the building module 121 and arranged widthwise above the main chamber 12, and in FIG. 17 where the biological filer tank 12 is positioned alongside the main chamber 12.

In the embodiment of FIGS. 18 and 19, the building module 123 has the main chamber 12, swirl chamber 14, and drum filter chamber 14 arranged as in FIGS. 1 to 4 but the biological filter tank 15 arranged above and to the back of the main chamber 12 and extending longitudinally. An opening 124 in the side wall of the building module 123 above the filter chamber 14 can accept a side door or shutter 124 which supports the air conditioning unit 118. Alternatively, the opening 124 can be used to gain access to the drum filter 64. A lid or cover 126 (shown in dotted outline), covers the tank 15 whilst a hinged lid or cover 127 (shown in dotted outline) covers the main chamber 12 to keep the sunlight out and assist in controlling the temperature and lighting artificially to promote maximum growth. As an alternative, the lid or cover 127 may be replaced by a roof and wall section 16 of the type shown in FIGS. 1 and 4 having a shutter 19 which allows access to the tank 12.

Referring now to FIGS. 20 to 23, there is illustrated an alternative configuration of building module 128 having a main base unit 129 incorporating the main chamber 12, and swirl chamber 13 and filter chamber 14. The chambers 12, 13 and 14 may be, as shown in dotted outline, of a circular cross sectional configuration (as may the corresponding components of the embodiments described above and below). The biological filter tank 15 (shown in dotted outline in FIG. 20) extends in this case over the main chamber 12 and swirl chamber 13 and may include a permanent divider 130 to separate it from the space above the swirl chamber 13. In this case, the tank 15 is closed by a lid 131 and the chamber 12 is closed by a pivotal lid 132 which incorporates sides 133 so as to fully enclose the space over the chamber 12 when the lid 132 is closed. The air conditioner 118 may be supported on a hinged door 134 at the end of the biological filter tank 15. FIG. 25 illustrates in exploded view the manner in which the components of the building module 128 may be assembled.

FIGS. 26 illustrate a pair of end sections 135 and 136 which may be fitted to either end of the building module 11 of FIGS. 1 to 4 to create a building 137 which has additional security and weather protection for operators. The end sections 135 and 136 have roofs 137 end and side walls 138 and 139, floors 140 and doors 141 in the end walls 129 such that operators can enter through the doors 41 to have access to opposite end of the building module 11.

In the embodiment shown in FIG. 26, the end sections 138 and 139 are integrally formed end sections. The end sections however may be formed as upper and lower halves as indicated by the dotted outline 142. As a further alternative, the base unit 143 of the building module 11 may be extended along the dotted lines 142 to define lower halves of each end section 135 and 136 incorporating the chambers 12, 13 and 14. The upper side of the building module 11 indicated at 144 may be extended at each end along the dotted outlines to define the upper halves of the end sections 135 and 136. The building 137 may thus be in upper and lower halves 145 and 146 as shown in FIG. 29 which may be integrally moulded, the upper half being a roof section incorporating the tank 15 and the lower half the chambers 12, 13 and 14.

FIGS. 30 to 31 illustrate yet a further embodiment of building 147 defining an aquaculture system which includes a full length roof section 148 overlying a base section 149 which defines in this case the main chamber 12, swirl chamber 13, filter chamber 14 and biological filter tank 15. Water flows from the main chamber 12 via the spillway 23 into the swirl chamber 13 which also receives water from the base of the chamber 12 as before. Water in the swirl chamber 13 then passes to the drum filter 64 and then chamber 14. The water in the chamber 14 then passes via duct 98 to the biological filter tank 15, water in the tank 15 then being returned to the main chamber 12. Foam fractionators 30 are provided adjacent the main chamber 12 as are ultraviolet units 31 and ozone reactor units 32 for water treatment as before. The building 147 is also provided with end sections 151 and 152 which provide sheltered walkway areas to the system. The roof section 148 may define a hip roof as shown in dotted outline in FIG. 30 or a flat roof as illustrated. The flat roof facilitates stacking of building modules 147 one on top of the other, side by side or cross stacked.

In the embodiment of building module 153 of FIGS. 33 to 35, the main chamber 12, swirl chamber 13 and filter chamber 14 are arranged in a first section 154 with a separate angled roof section 155 and the biological filter tank 12 is defined by a separate unit 156 which may be positioned in juxtaposition with the first section 154 as illustrated in FIGS. 35 and 36. The unit 156 is provided with a lid 157 which provides access to the interior of the tank 15, the lid 157 being angled when closed and matching the angled roof section 155. In this embodiment, the tank 12 has an increased height therefore a larger cleaning capacity. Shutters 158 in the walls of the roof section 155 can be opened provide selected access to the interior of the first section 154 for servicing of the components or monitoring operation of the system.

The building 153 of FIGS. 33 to 35 may be modified to have a flat roof so as to enable buildings 153 to be stacked. Thus the roof section 155 may be flat as shown in dotted outline at 159 in FIG. 33 and the unit 156 housing the biological filter tank 15 may also have a matching flat roof 160. To facilitate stacking, access to the tank 15 may be provided through a side shutter 161.

Whilst it is preferred that the parts of the aquaculture buildings are formed integrally where possible, an aquaculture building 162 may be constructed from a series of modules as illustrated in FIGS. 36 to 39. Thus the main chamber 12 may be formed in a separate module 163 which also carries the foam fractionators 30, ultraviolet units 31 and ozone reactors 32 if required. The swirl chamber 13 may be formed in a separate module 164, the drum chamber 14 in a separate module 165 and the biological filter tank 15 as a separate module 166. The modules 163, 164, 165 and 166 may then be butted up against each other to form the building 163. Suitable plumbing is provided where required to enable communication between the modules by means of pipes moulded into the walls and floors of the modules. A separate roof module 167 may also be provided and assembled with the modules 163, 164, 165 and 166 to define a closed environment as shown in FIG. 39. The roof module 167 may define access openings 168 closable by shutters as before allowing access to the system but closing the system to maintain the closed environment. The roof module 167 as shown in FIG. 37 may define a hip roof or alternatively a flat roof as in FIG. 39 thereby allowing the building to be stacked.

Figure 40:
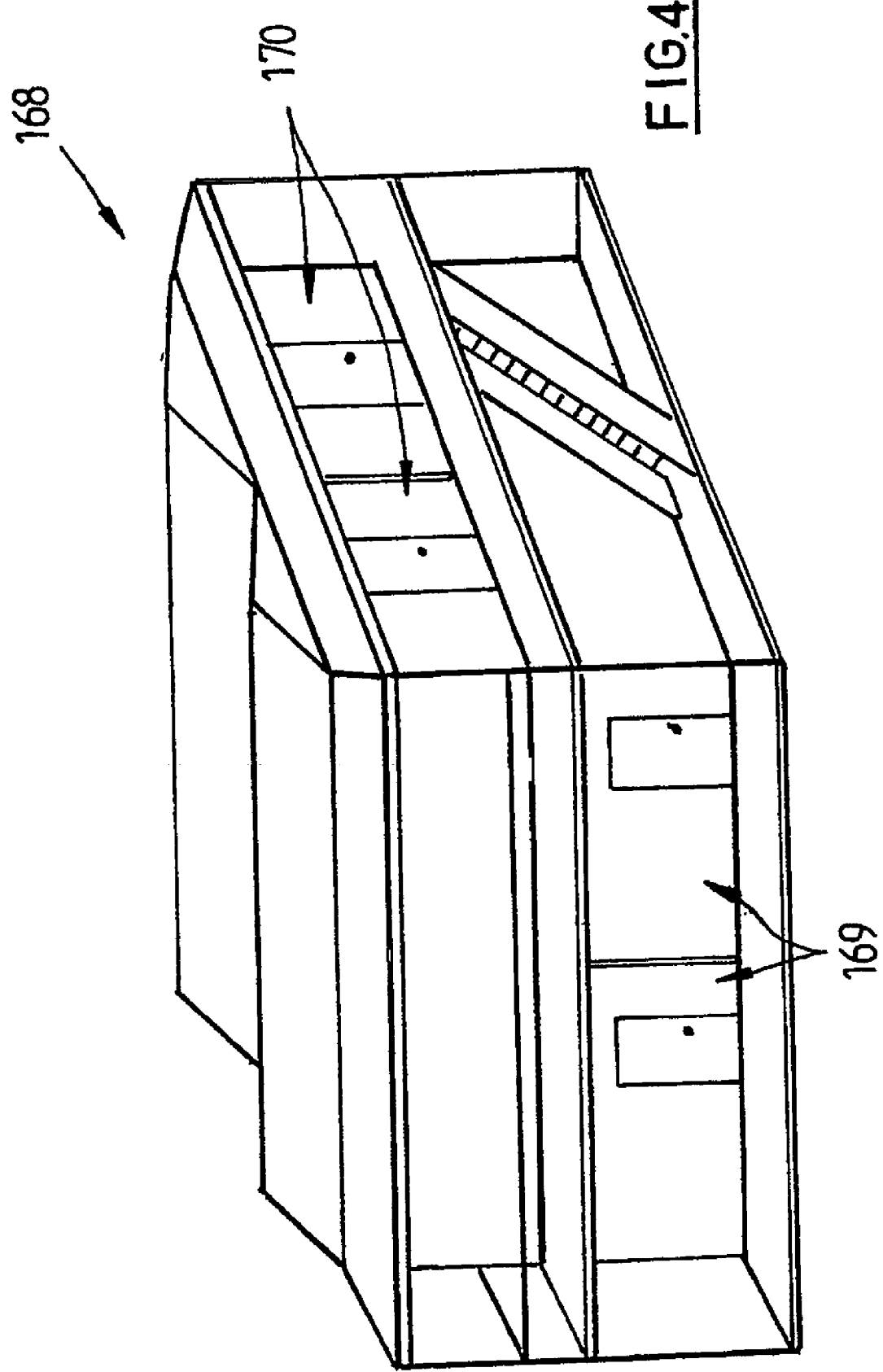
FIGS. 40 and 41 illustrates typical aquaculture buildings which may be defined by stacked building modules with flat roofs such as of the type illustrated in FIGS. 30, 33 or 39.
Figure 41:
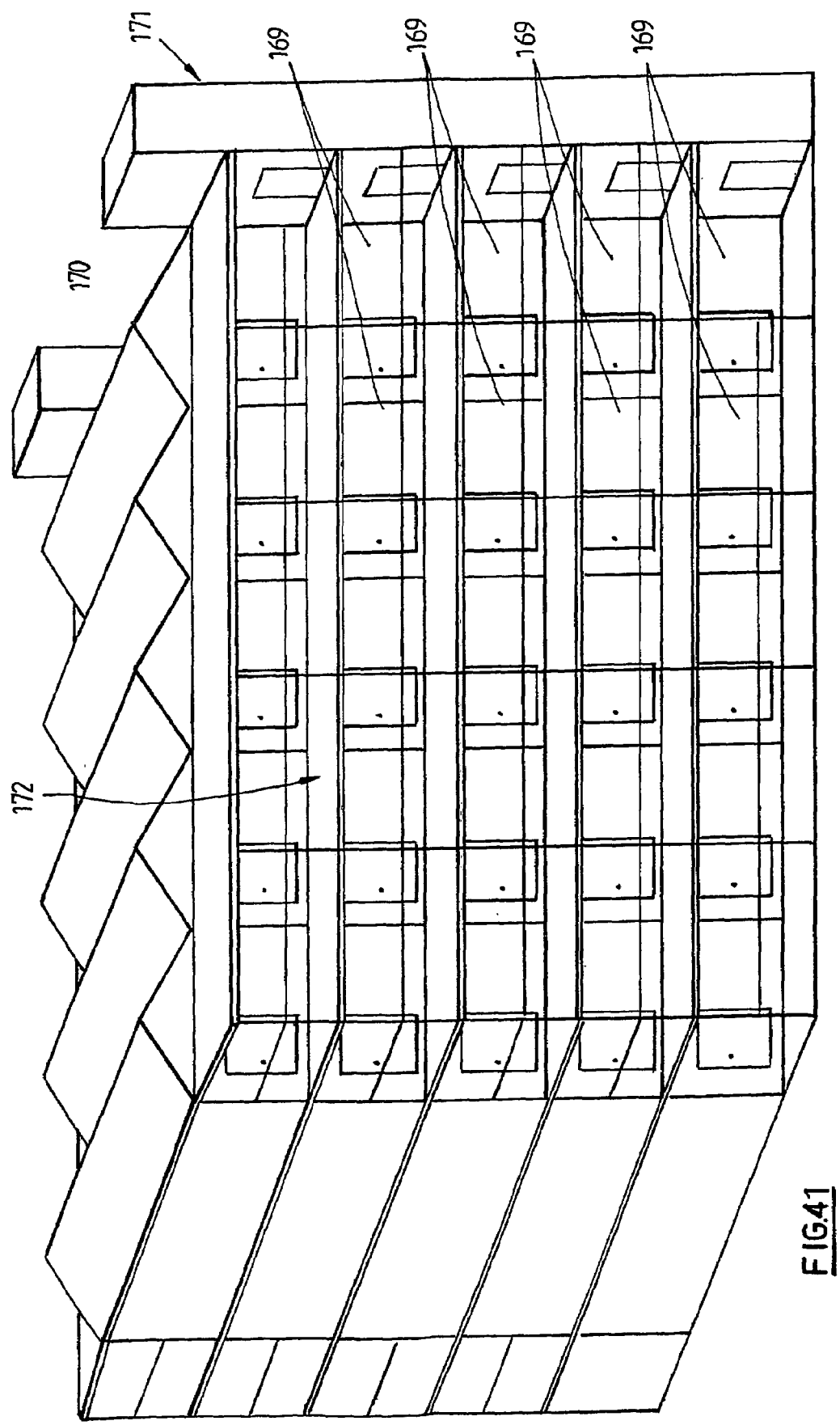

FIG. 40 illustrates a two level building 168 formed by a plurality of cross stacked building modules 169 and 170 with the building modules 169 at the lower level having flat roofs for example of the type described with reference to FIG. 30, 33, or 39 whilst the upper level modules 170 may have hip roofs as illustrated or flat roofs. In the embodiment of FIG. 41, twenty-five modules are arranged in stacks one above the other in rows of five again with the lower modules 169 having flat roofs and the modules 170 in the uppermost level having flat or hip roofs. It will be appreciated that the modules 169 and 170 may be stacked in many different configurations to form buildings of various sizes and configurations and where required, suitably walkways or verandahs 172 may be provided between the modules. The modules 169 and 170 may operate as individual aquaculture systems or alternatively, the modules may be linked together so that the water circulates through all modules. The modules may for example contain different types of fish or marine invertebrates.

In the embodiment of FIGS. 42 to 45, the aquaculture building 173 has the main chamber or chamber unit 174 containing the chamber 12, swirl filter chamber 13 and filter chamber 14 formed as a single unit with the biological filter tank 15 although the components may be formed separately and joined as in FIG. 35 and 36. The biological filter tank 15 is of smaller size and closed by a hinged lid 175. A hip roof section 176 is provided to overlie the main unit 176, the roof section 176 having openings 177 providing access to the main unit 174, the openings 177 being closable by shutters to define a closed environment or space over the chambers 12, 13 and 14.

In the embodiment of FIGS. 46 to 48 which is similar to the embodiment of FIGS. 42 to 45, a pair of biological filter tanks 15 are provided on opposite sides of the main unit 174, each of which is closable by a lid 175. The tanks 12 may be formed integrally with the main unit 174 or as separate modules attachable to the main unit 12. In each case air vents 178 may be provided in the lids 175 for escape of gases generated by the biological filter medium.

FIGS. 50 and 51 illustrate an alternative embodiment of aquaculture building module 179 in which in this case the main chamber 180 is of elongated form and includes a central divider 181 to form the chamber 180 into an endless loop. Swirl chambers 13 which communicate with the main chamber 180 are formed in each end of the building module 179 being of either hexagonal or circular configuration as illustrated. In addition, filter chambers 14 are formed adjacent to and communicating with the swirl chambers 13. Each chamber 180, 13 and 14 may be moulded into the base of the building 179 for example by concrete or fiberglass moulding. The central divider 181 also is provided at opposite ends with foam fractionators 30 which communicate with the main chamber 180 via ultraviolet units 31. Ozone reactors 32 (not shown) may also be provided in the central divider 181 to communicate with the foam fractionators 30. Outlet ducts 37 from the foam fractionators 30 extend in the direction of circulation flow around the chamber 180 to assist in that flow. Biological filter tanks 15 are provided at each end of the building 179 extending transversely of the main chamber 180, each receiving water from the adjacent drum filter chamber 14. Outlets 111 from the tanks 15 direct water from the tanks 15 back into the main chamber 180 in the direction of flow of water around the main chamber 180. The building 179 includes a roof section 182 over all the chambers 180, 13 and 14 and between the tanks 15 to define an enclosed climate controlled space. A walkway 183 provides access to the central divider 181 from the side of the building 179 for servicing the components in the divider 181 or monitoring operation of the system.

The aquaculture system defined by the building 179 functions in the same manner as described above with fish or other marine invertebrate located within the main chamber 180 with water circulating around the main chamber 180 in the clockwise direction. Water in the main chamber 180 is subject to treatment by the foam fractionators 30 and ultraviolet units 31 (and ozone reactors 32 where employed). Water further flows to the swirl chambers 13 through spillways 23 and then to the filter drums 64 for fine filtering. Water is then pumped from the chamber 14 to the biological filter tanks 15 where it is subject to the biological medium therein and return to the main chamber 11.

In the embodiment of FIGS. 52 and 53, the building module 184 includes an elongated main chamber 185 having a central divider 186 however in this case the foam fractionators 30, ultraviolet units 31 (and ozone reactors 32 where used) are provided at one end of the main chamber 185. A swirl chamber 13 and filter chamber 14 having a drum filter 64 are provided at the opposite ends of the chamber 185. The biological filter tank 15 is provided adjacent the swirl chamber 13 and filter chamber 14 extending transversely of the main chamber 185. Water is pumped to the tank 15 for treatment from the filter chamber 14 through pump lines 98 whilst the outlet 111 from the tank 15 directs water back into the main chamber 185. Sediment drains or collectors 187 defined by recess in the floor of the main chamber 187 communicate through ducting 188 with the swirl chamber 13 which draws in the collected sediment. A roof and wall section 189 defines a closed space over the chambers 185, 13 and 14 with the climate in the space being governed by an air conditioning unit 118. A door accessible walkway 190 provides access to the central divider 186. The sides of the roof and wall section 189 may be provided with hatches 191 providing access to the main chamber 185. This embodiment also functions in the same manner as described above.

FIGS. 54 and 55 illustrate yet a further embodiment of building 191 defining an aquaculture system according to the invention similar to the embodiment of FIGS. 52 and 53 however in this case three foam fractionators 30 and associated ultraviolet units 31 and ozone reactors 32 are provided to communicate with the water in the main chamber 192. Water is drawn into the swirl chamber 13 by sediment drains 187 as in the embodiment of FIGS. 52 and 53 however water passes from the filter chamber 14 through duct 193 back to the main chamber 192. In this embodiment, a biological filter tank 15 is not employed with this function being carried out by biological contactors which are in the form of paddle wheels 194 (in this case four) supported at spaced positions in the main chamber 192 and being free for rotation about horizontal axes. The paddle wheels are substantially submerged within the water within the chamber 192 but rotate with circulating flow through the chamber. The paddle wheels 194 carry internally, a biological filter medium 195 to which the water in the chamber 192 is continually subject as it causes rotation of the paddle wheels 194.

In the embodiments of FIGS. 50 to 55, the building modules 179, 184 and 191 are preferably formed as a separate lower section or moulding which forms the main chambers and swirl and filter chambers 13 and 14 and a separate roof section or moulding which is placed over and seals off the lower section to enable climate control and therefore temperature control of the water within the chambers and of the air pumped through the foam fractionators 30 and biological tank 15 where used. The main chambers and swirl and filter chambers 13 and 14 however may be formed as separate units or mouldings which may be abutted with, and joined to each other.

Referring now to FIG. 56, there is illustrated a further embodiment of foam fractionator 196 for use in the aquaculture system of the invention. In this case, the separate ultraviolet chamber 39 is eliminated and the ultraviolet light generators 41 provided as a single tube set or a multiple tube set arranged circumferentially about the funnel 50. The chamber 197 communicates through upper and lower ducts 198 and 199 with the main chamber 12.

In the configuration of FIG. 57, the foam fractionator 200 has a foam collector 201 which is in the form of an inverted cone which is located around the sides of the fractionator chamber 202 so that the foam 203 is collected around the outer sides of the chamber 202. Multiple outlets 204 are provided to direct the collected foam 203 outwardly of the chamber 202 to waste. The foam collector 201 surround a central ultraviolet light generator 41 which kills pathogens and bacteria in the water. It will be noted that in this embodiment, a submersible pump 30 is provided in the chamber 202 to assist in flow of water back into the main chamber 12 through duct 205.

Referring now to FIGS. 58 and 59, there is illustrated a further form of drum filter arrangement for use in the aquaculture system of the invention. The drum filter 206 is of similar construction to the filter 64 of FIG. 7 in that it includes annular end walls 207 joined by longitudinally extending ribs 208 around which a filter fabric or material 209 is wrapped and secured. The filter 206 is also supported for rotation on spaced wheels 210 mounted to baffles 211 and the drum filter 206 is supplied with water from the swirl chamber in by a feed tube 212 in a similar manner to that described with reference to FIG. 7 except that openings 213 in the tube 212 permit water to pass downwardly from the tube 212 through the filtering fabric 209 of the filter 206. To effect rotation of the drum filter 206, one or both ends walls 207 are provided with a number of circumferentially spaced members 214 which may comprise extension of the ends of the ribs 208 and be shaped to cooperate with water supplied through a feed tube 215. This action effects rotation of the drum filter 206 to continuously present a new section of filter fabric 209 to the water exiting the openings 213. As with the embodiment of FIG. 7, air and water cleaning tubes 216 and 217 are provided for spraying at timed intervals water or air through the fabric 209 for collection in the trough 218 for direction to the waste pipe 87.

As an alternative driving arrangement shown in FIG. 60, one or more of the guide wheels 210 may be driven by an electric or hydraulic motor 219 via an endless belt or chain 220 to cause rotation of the driven wheel 210 and thus the drum filter 206 to continuously present a new filtering surface to incoming water. In yet an alternative arrangement shown in FIG. 61, the drum filter 206 may be directly driven by being coupled through a wheel or pulley 221 coaxial with the drum filter 206 and a drive belt or chain 222 to a drive motor 223.

The drum filters described in the above embodiments do not need or use a vertical screen which reduces the area of mesh for the water to strain through, have no centre shaft or bearings, and do not need a special outer housing. The drum filters can be mounted on a simple cradle and suspended over the fish tank if required, and can clean themselves whilst continuing to operate at full capacity. As the drum filters do not have a shaft, components can easily fitted within the interior of the filter. By incorporating the use of compressed air as well as water, the drum filter can clean continually or spasmodically which ever is required. The water and air bars can be set side-by-side for individual use or incorporated into one. Other gases may be used for cleaning provided they are non-toxic or polluting.

The drum filter systems described above may of course be used in aquaculture systems other than those described or in any other filtering application. Similarly the described foam fractionators (with or without associated ultraviolet and ozone reactor units) may be employed in other aquaculture systems.

In each of the above building modules, light sources 224 such as incandescent or fluorescent lights may be provided in space above the main chamber 12 to create artificial light conditions for growing of fish or marine invertebrates. The light sources 224 may be controlled by timers to create artificial day and night conditions to replicate external conditions.

The present invention thus provides a self contained aquaculture system incorporated in and defined by a building which may be used in many different environments. Further as the internal temperature within the building can be simply and effectively controlled, control of the water temperature in which fish or marine invertebrates are growing can also be controlled resulting in improved growing conditions and efficiency of operation.

The invention claimed is:

1. A self-contained aquaculture system comprising a modular building, said building having a base section, a main water chamber for containing fish or marine invertebrates formed within said base section, said base section having side walls, at least a portion of one of said side walls having an inner side and an outer side, said inner side comprising portion of a side wall of said main chamber, said building further having a top section covering at least said main chamber and defining an enclosed space above said main chamber, water treatment means within at least said base section of said building and adjacent said main chamber for treating water from said main chamber, means for circulating water for flow from said main chamber through said water treatment means and back to said main chamber, and means for controlling the air temperature within said enclosed space.

2. A system as claimed in claim 1 wherein said top section includes a roof and side walls, said side walls of said top section being aligned with the side walls of said base section.

3. A system as claimed in claim 1 wherein said base section and said main chamber are moulded from a mouldable material and wherein said main chamber is integrally moulded with at least part of said base section.

4. A system as claimed in claim 1 wherein said water treatment means includes a primary filter and a secondary filter for filtering solids from water in said main chamber.

5. A system as claimed in claim 4 wherein said primary filter comprising a second chamber which is located adjacent to said main chamber, first communicating means for connecting the base of the main chamber to the second chamber whereby solids gathering in the base of the main chamber may pass into the second chamber and second communicating means connecting the main chamber to the second chamber whereby water and solids may flow from the top level of water in the main chamber into the second chamber.

6. A system as claimed in claim 5 wherein said second communication means comprises a spillway whereby water in said main chamber above the level of the spillway may flow into said second chamber.

7. A system as claimed in claim 4 wherein said secondary filter comprises a drum filter having a screen or mesh filtering material, rotatable rollers externally of said drum filter for supporting said drum filter for rotation and means for conveying water from the primary filter to the interior of said drum filter for passage through said screen or mesh material.

8. A system as claimed in claim 7 wherein said drum filter has means adapted to cooperate with said water conveyed from said primary filter to effect rotation of said drum filter.

9. A system as claimed in claim 8 wherein said means adapted to cooperate with said water comprise a plurality of circumferentially spaced members and wherein said water conveying means has a water outlet or outlets adjacent said members.

10. A system as claimed in claim 9 wherein said circumferentially spaced members comprise a plurality of circumferentially spaced and longitudinally extending ribs supporting said filter screen or mesh material and extending between a pair of end circular or annular members, said end members being supported on said rollers.

11. A system as claimed in claim 9 wherein said means for conveying water from the primary filter to the drum filter comprises a feed duct extending from said primary filter longitudinally within said drum filter, said feed duct including a generally radially extending duct member having a said water outlet.

12. A system as claimed in claim 11 wherein said feed duct is at a level in said second chamber to maintain the water level therein beneath the water level in said main chamber.

13. A system as claimed in claim 7 and including means for cleaning said filter screen or mesh material, said cleaning means comprising means above said drum filter for spraying water against said screen or mesh material and/or for applying pressurized air against the screen or mesh material and there being means internally of said drum filter for catching and collecting materials dislodged from the filter screen or mesh material and conveying said materials to waste.

14. A system as claimed in claim 13 wherein said means for catching said dislodged materials comprises a hopper internally of said drum filter, said hopper communicating with a waste line.

15. A system as claimed in claim 7 and including a third chamber in said base section and wherein said drum filter is supported over said third chamber such that water passing through said drum filter collects therein, said third chamber including biological filter media and defining a first biological filter.

16. A system as claimed in claim 15 and including a further biological filter, said further biological filter comprising a fourth chamber carrying biological filter media, means for conveying water from said third chamber to said fourth chamber and means for conveying water from said fourth chamber back to said main chamber.

17. A system as claimed in claim 16 wherein said means for conveying water from said third chamber to said fourth chamber includes means at the upper end of said fourth chamber for spraying said water over said biological filter media and there being provided means for supplying air to said fourth chamber for flow through said biological filter media therein in a direction against water flow through said biological filter media.

18. A system as claimed in claim 1 wherein said water treatment means includes at least one foam fractionator for treatment of water in said main chamber, said foam fractionator comprising a chamber, an inlet to said foam fractionator chamber communicating with said main chamber for receiving water therefrom, a return line for returning water from said foam fractionator chamber to said main chamber, and means for supplying air to a lower portion of said foam fractionator chamber for bubbling through water therein.

19. A system according to claim 18 and including a funnel member in said foam fractionator chamber at or adjacent the upper level of water in the foam fractionator chamber for collecting bubbles or foam at the surface of the level of water, said funnel member being connected to waste and means for supplying air to said return line to assist in water flow back to the main chamber and circulation of water in the main chamber.

20. A system as claimed in claim 19 and including an ultraviolet treatment chamber connected to said main chamber and said foam fractionator inlet whereby water from the main chamber is subject to exposure to ultraviolet light.

21. A system as claimed in claim 20 wherein said ultraviolet treatment chamber is located in or adjacent said side wall of said main chamber and includes an ultraviolet light source, said ultraviolet treatment chamber including an inlet communicating with said main chamber and an outlet communicating with said inlet of said foam fractionator chamber.

22. A system as claimed in claim 18 and including an ozone reactor for supplying ozone to water in said foam fractionator chamber for bubbling through water in said foam fractionator chamber.

23. A system as claimed in claim 17 wherein air for supply to said fourth chamber of said further biological filter chamber is provided by one or more air pumps which pump air from within said building at the internal building temperature as determined by said air temperature controlling means to thereby control the temperature of water in said biological filter chamber and thereby in said main chamber.

24. A system as claimed in claim 18 wherein air for supply to said foam fractionator is provided by one or more air pumps which pump air from within said building at the internal building temperature as determined by said air temperature controlling means to thereby control the temperature of water in said foam fractionator and thereby in said main chamber.

25. A system as claimed in claim 16 wherein said fourth chamber of said further biological filter is defined by a tank.

26. A system as claimed in claim 25 wherein said tank is supported above said main chamber and wherein water conveyed from said fourth chamber back to said main chamber flows under the influence of gravity back into the main chamber.

27. A system as claimed in claim 1 wherein said means for controlling the temperature in said enclosed spaced comprises air conditioning means.

28. A self-contained aquaculture system comprising a modular building, said building having a base section, a main water chamber for containing fish or marine invertebrates formed within said base section, a second swirl chamber comprising a primary filter formed in said base section adjacent said main water chamber, means communicating said main chamber with said second chamber for removing solids from water in said main chamber, fine filtering means comprising a secondary filter for receiving water and filtering water from said second chamber, a third biological filter chamber formed within said base section adjacent said second chamber for receiving water from said fine filtering means, said building module further including a top section or sections covering said main water chamber, and said second and third chambers and defining an enclosed space or spaces over said chambers, means for circulating water for flow from said main chamber through said second chamber, fine filtering means and said third chamber back to said main chamber, and means for controlling the air temperature within said enclosed space or spaces.

29. A system as claimed in claim 28 wherein the level of water in said third chamber is maintained lower than the level of water in said second chamber and the level of water in said second chamber is maintained lower than the level of water in said main chamber whereby water flows from said main chamber to said third chamber under the influence of gravity.

30. A system as claimed in claim 28 and including a further biological filter chamber, said further biological filter chamber being defined by a biological filter tank, said tank being arranged adjacent to the main chamber or above the main chamber.

31. A system as claimed in claim 28 wherein said main chamber includes a side wall and wherein one or more foam fractionators are provided in or adjacent said side wall, the or each said foam fractionator including an inlet communicating with said main chamber for receiving water from said main chamber and an outlet communicating with said main chamber for return of water to said main chamber.

32. A system as claimed in claim 28 wherein said main chamber is of elongated configuration and a central divider is provided therein such that flow circulates around the central divider and wherein said primary and secondary filters are provided at one or both ends of said main chamber.

33. A system as claimed in claim 32 wherein one or more foam fractionators for treatment of water in said main chamber are arranged in said central divider, the or each said foam fractionator having an inlet and outlet communicating with said main chamber.

34. A system as claimed in claim 28 wherein said base section is moulded from concrete or other mouldable material and wherein said chambers are formed integrally in said base section.

35. A system as claimed in claim 30 wherein said biological filter tank is formed as a separate unit moulded from concrete or other mouldable material.

36. A system as claimed in claim 35 wherein said top section or sections include said biological filter tank supported above said main chamber and one or more roof and wall sections which cooperate with said biological filter tank to define enclosed spaces over said main chamber, and second and third chambers.

37. A system as claimed in claim 30 wherein said biological filter tank is formed as a separate unit which extends to the full height of said modular building and wherein said top section includes one or more roof or wall sections defining an enclosed space over said main, second and third chambers.

38. A system as claimed in claim 28 wherein said chambers are moulded as separate units, said units being assembled by being abutted against each other to form said base section and wherein said top section comprises a roof and wall section which covers and encloses said assembled chambers.

39. A system as claimed in claim 30 wherein one or more biological filter tanks are provided to one or both sides of the main chamber and second and third chambers, said main chamber, second and third chambers being covered and enclosed by a top section comprising a roof and wall section and wherein said biological filter tank or tanks are covered with separate roofs or lids.

40. A system as claimed in claim 28 wherein said top section or sections of said modular building has a flat roof whereby modular buildings may be stacked one above the other to form a multi-level building.

41. A system as claimed in claim 28 wherein said fine filtering means comprises a drum filter supported externally for rotation and wherein said second chamber includes an outlet extending into the interior of said drum filter which maintains the level of water in said second chamber lower than the level of water in said main chamber.

42. A system as claimed in claim 41 and including a further biological filter chamber, pump means for pumping water from said third chamber to said further biological filter chamber and for maintaining the level of water in said third chamber below the level in said second chamber, and means for conveying water in said further filter chamber back to the main chamber.

43. A self-contained aquaculture system comprising a portable modular building, said building having a base section, a main water chamber for containing fish or marine invertebrates, said main water chamber being moulded integrally with at least part of said base section, said building further having a top section covering at least said main chamber and defining an enclosed space above said main chamber, water treatment apparatus within at least said base section of said building and adjacent said main chamber for treating water from said main chamber, means for circulating water for flow from said main chamber through said water treatment apparatus and back to said main chamber, and means for controlling the air temperature of water within said main chamber.

44. A self-contained aquaculture system as claimed in claim 43 wherein said base section includes a integrally moulded chamber comprising a swirl chamber adjacent said main chamber and communicating with said main chamber for receiving water therefrom, said swirl chamber comprising said water treatment apparatus.

45. A self-contained aquaculture system as claimed in claim 44 wherein said water treatment apparatus includes a rotatable drum filter having a screen or mesh filtering material and means for conveying water from said main chamber to said drum filter.

46. A self-contained aquaculture system as claimed in claim 44 wherein said base section includes an integrally moulded biological filter chamber for containing a biological filter media, and means for supporting said drum filter above said biological filter chamber whereby said biological filter chamber receives filtered water from said drum filter.

47. A self-contained aquaculture system as claimed in claim 46 wherein said water treatment apparatus includes a further moulded biological filter chamber for containing a biological filter media, means for conveying water from the first biological filter chamber to said further biological filter chamber and means for returning water from said further biological chamber to said main chamber.

48. A self-contained aquaculture system as claimed in claim 46 wherein said part of said base section containing said main water chamber is moulded as a module separate from said swirl chamber and biological filter chamber.

* * * * *